(12) United States Patent
 Lee

(10) Patent No.: US 12,056,591 B2
(45) Date of Patent: Aug. 6, 2024

(54) METHOD AND APPARATUS FOR PROCESSING CONVOLUTION OPERATION IN NEURAL NETWORK

(71) Applicant: Samsung Electronics Co., Ltd., Suwon-si (KR)

(72) Inventor: Sehwan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/453,615

(22) Filed: Aug. 22, 2023

(65) Prior Publication Data

US 2023/0394277 A1 Dec. 7, 2023

Related U.S. Application Data

(63) Continuation of application No. 16/558,493, filed on Sep. 3, 2019, now Pat. No. 11,769,037.

(30) Foreign Application Priority Data

Dec. 27, 2018 (KR) ........................ 10-2018-0171132

(51) Int. Cl.
 *G06N 3/04* (2023.01)
 *G06F 17/15* (2006.01)
 *G06N 3/045* (2023.01)

(52) U.S. Cl.
 CPC ............... *G06N 3/04* (2013.01); *G06F 17/15* (2013.01); *G06N 3/045* (2023.01)

(58) Field of Classification Search
 None
 See application file for complete search history.

(56) References Cited

U.S. PATENT DOCUMENTS

| 9,996,890 | B1 | 6/2018 | Cinnamon et al. |
| 11,182,594 | B2 | 11/2021 | Lai et al. |
| 11,769,037 | B2 * | 9/2023 | Lee ........................ G06N 3/045 |
| | | | 706/15 |
| 2016/0358068 | A1 | 12/2016 | Brothers et al. |
| 2016/0358069 | A1 | 12/2016 | Brothers et al. |
| 2018/0046437 | A1 | 2/2018 | Lo |
| 2018/0129893 | A1 | 5/2018 | Son et al. |

(Continued)

FOREIGN PATENT DOCUMENTS

| EP | 3 401 840 A1 | 11/2018 |
| KR | 10-2018-0050928 A | 5/2018 |

OTHER PUBLICATIONS

Rajbhandari, Samyam et al., "Optimizing CNNs on Multicores for Scalability, Performance and Goodput", ACM SIGARCH Computer Architecture News, vol. 45, Issue 1, 2017 (pp. 267-280).

(Continued)

*Primary Examiner* — James A Thompson
(74) *Attorney, Agent, or Firm* — NSIP Law

(57) ABSTRACT

Provided are a method of performing a convolution operation between a kernel and an input feature map based on reuse of the input feature map, and a neural network apparatus using the method. The neural network apparatus generates output values of an operation between each of weights of a kernel and an input feature map, and generates an output feature map by accumulating the output values at positions in the output feature map that are set based on positions of the weights in the kernel.

10 Claims, 18 Drawing Sheets

(56) References Cited

U.S. PATENT DOCUMENTS

| | | |
|---|---|---|
| 2018/0150721 A1 | 5/2018 | Mostafa et al. |
| 2018/0189643 A1 | 7/2018 | Kim et al. |
| 2018/0259608 A1 | 9/2018 | Golden et al. |
| 2018/0285715 A1 | 10/2018 | Son et al. |
| 2018/0315155 A1 | 11/2018 | Park et al. |
| 2019/0303715 A1* | 10/2019 | Jiang ................. G06F 18/24137 |
| 2020/0134460 A1* | 4/2020 | Du ........................ G06N 3/048 |
| 2020/0175338 A1 | 6/2020 | Croxford et al. |

OTHER PUBLICATIONS

Extended European Search Report on May 29, 2020 in the in counterpart European Patent Application No. 19215554.7 (8 pages in English).

Japanese Office Action Issued on Nov. 21, 2023, in Counterpart Japanese Patent Application No. 2019-232816 (6 Pages in English, 5 Pages in Japanese).

* cited by examiner

FIG. 2A
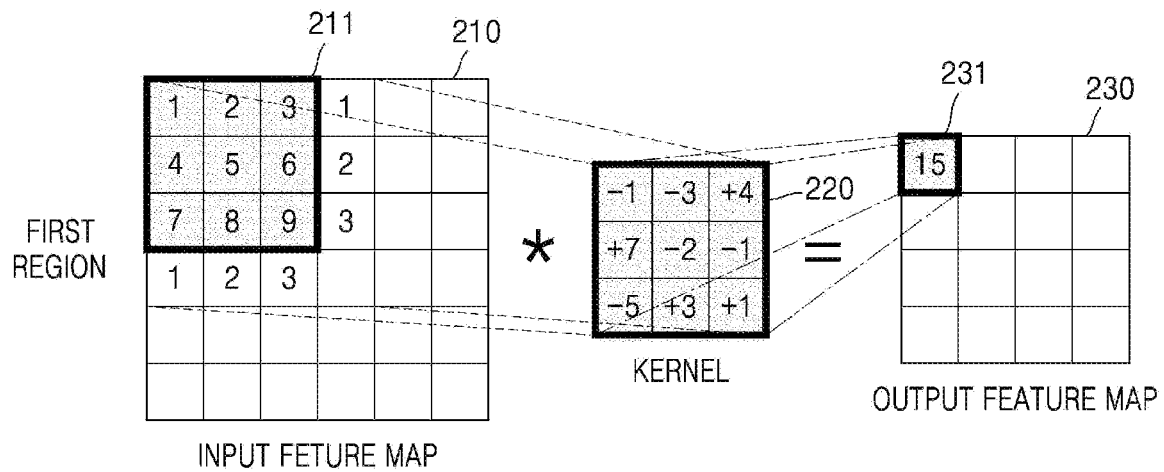
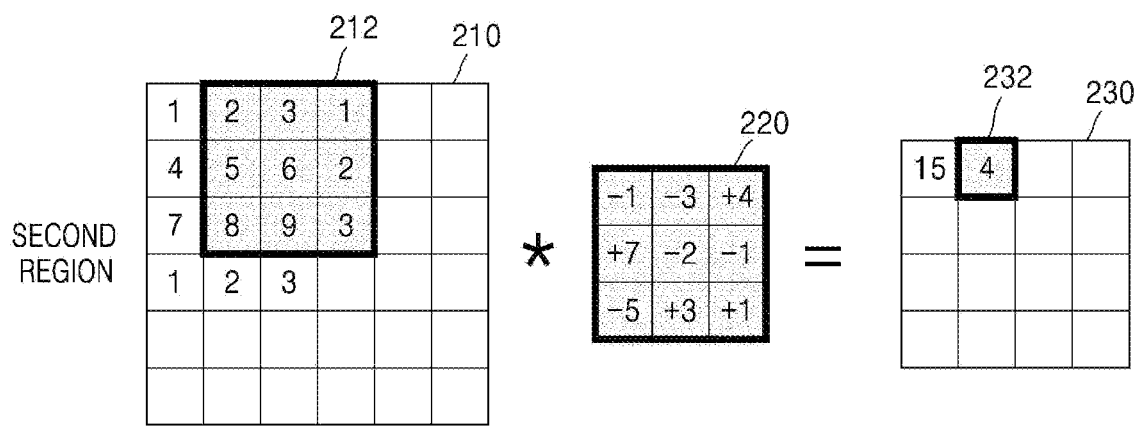
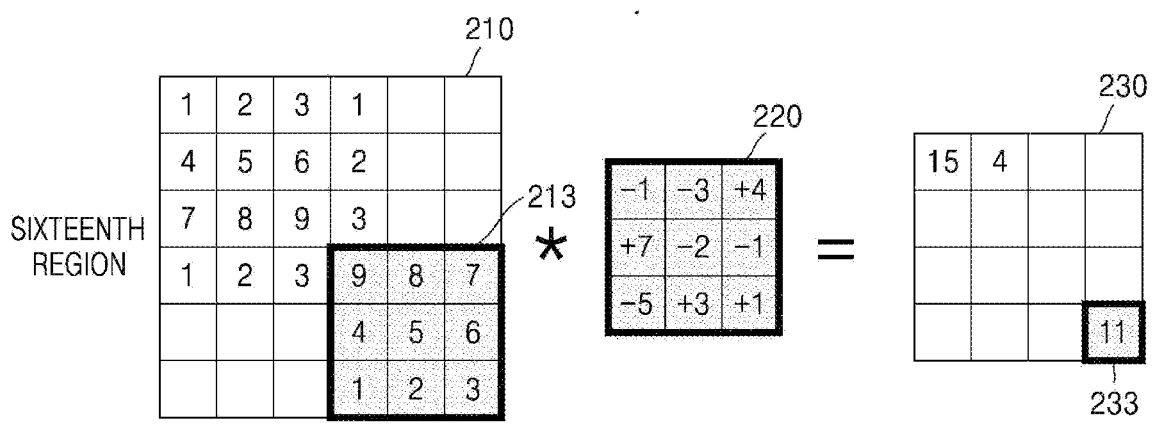

FIG. 2B
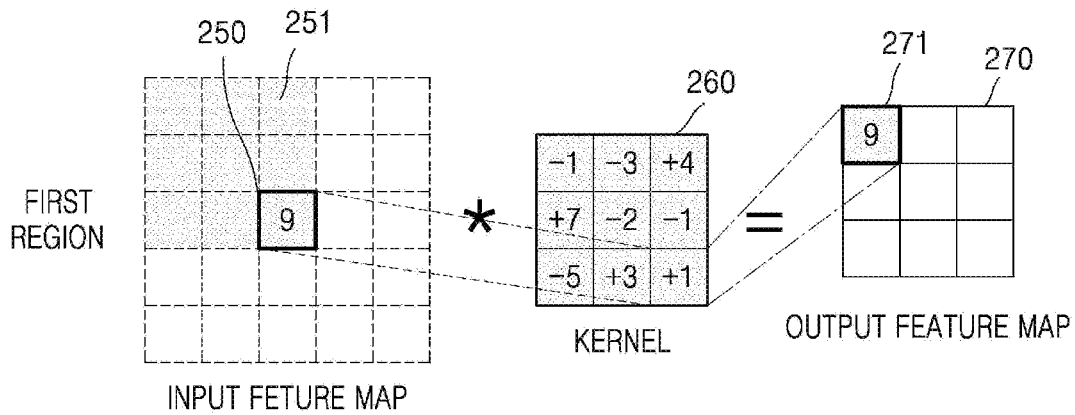
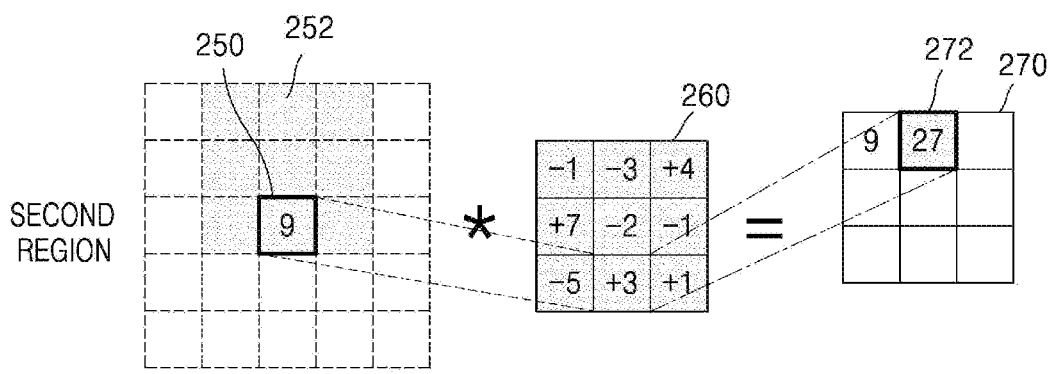
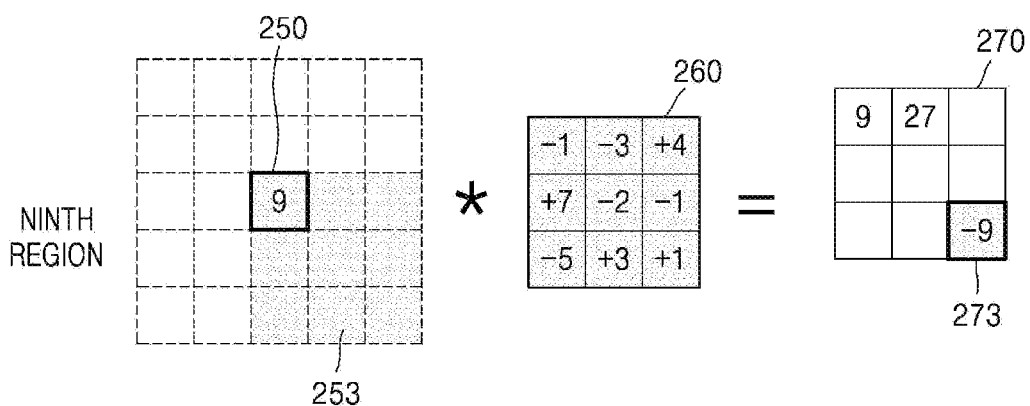

METHOD AND APPARATUS FOR PROCESSING CONVOLUTION OPERATION IN NEURAL NETWORK

CROSS-REFERENCE TO RELATED APPLICATION

This application is a continuation of U.S. patent application Ser. No. 16/558,493, filed on Sep. 3, 2023, which claims the benefit under 35 USC § 119(a) of Korean Patent Application No. 10-2018-0171132, filed on Dec. 27, 2018, in the Korean Intellectual Property Office, the entire disclosure of which is incorporated by reference for all purposes.

BACKGROUND

1. Field

Provided are methods and apparatuses for processing a convolution operation in a neural network.

2. Description of Related Art

Neural networks are specialized computational architecture, which after substantial training may provide computationally intuitive mappings between input patterns and output patterns. According to recent developments in neural network technology, input data is analyzed using a neural network apparatus in various types of electronic systems and valid information is extracted.

A neural network apparatus performs a large amount of operations with respect to input data. Studies have been conducted on a technology capable of efficiently processing neural network operations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a neural network apparatus including a processor configured to generate output values of an operation between each of weights of a kernel and an input feature map, and generate an output feature map by accumulating the output values at positions in the output feature map that are set based on positions of the weights in the kernel.

The processor may be configured to generate a first output value by performing an operation between the input feature map and a first weight of the kernel, accumulate the first output value at a first position in the output feature map that is based on a position of the first weight in the kernel, generate a second output value by performing an operation between the input feature map and a second weight of the kernel, and accumulate the second output value at a second position in the output feature map that is based on a position of the second weight in the kernel.

The processor may be configured to generate first output values by performing an operation between a first region of the input feature map and each of the weights of the kernel, generate a first partial output feature map by accumulating the first output values at positions in the first partial output feature map that is based on the positions of the respective weights in the kernel, and accumulate the first partial output feature map on the output feature map.

The processor may be configured to generate second output values by performing an operation between a second region of the input feature map and each of the weights of the kernel, the second region being different from the first region, generate a second partial output feature map by accumulating the second output values at positions in the second partial output feature map that is based on the positions of the respective weights in the kernel, and accumulate the second partial output feature map on the output feature map.

The first region may include at least one of n pixels, n×m pixels, or n×m×l pixels in the input feature map, wherein n, m, and l are natural numbers greater than or equal to 1.

The processor may be configured to skip an operation between the input feature map and a first weight of the weights, in response to the first weight of the kernel being zero.

The processor may be configured to perform an operation between the each of the weights of the kernel and a compressed input feature map by continuously stream-reading the compressed input feature map from a memory.

The processor may include operation units configured to generate partial output feature maps by performing an operation between a different region from among regions of the input feature map and the kernel, and output units configured to generate each of the regions of the output feature map by accumulating one or more partial output feature map from among the partial output feature maps.

One or more of the operation units may be configured to perform the operation between the kernel and the different region independently of and in parallel with each other.

The neural network apparatus may include a bus, wherein the output units may be configured to receive the one or more partial output feature map from the operation units through the bus.

Each of the operation units may include a plurality of processing units configured to generate the partial output feature maps by performing an operation between a region from among the regions of the input feature map and each of a plurality of kernels.

The processing units comprise a first processing unit configured to perform an operation between the region and a first kernel and a second processing unit configured to perform an operation between the region and a second kernel, and the first processing unit may be configured to perform a part of the operation between the region and the second kernel, after completing the operation between the region and the first kernel.

The apparatus may include a memory storing instructions that, when executed, configures the processor to generate the output values and to generate the output feature map.

In another general aspect, there is provided a method of processing a convolution operation in a neural network, the method including generating output values of an operation between each of weights of a kernel and an input feature map, and generating an output feature map by accumulating the output values at positions in the output feature map that are set based on positions of the weights in the kernel.

The generating of the output values may include generating a first output value by performing an operation between the input feature map and a first weight of the kernel, and generating a second output value by performing an operation between the input feature map and a second weight of the kernel, and the generating of the output feature map may include accumulating the first output value at a first position in the output feature map that is based on a position of the first weight in the kernel, and accumulating the second output value at a second position in the output feature map that is based on a position of the second weight in the kernel.

The generating of the output values may include generating first output values by performing an operation between a first region of the input feature map and each of the weights of the kernel, and generating second output values by performing an operation between a second region of the input feature map and each of the weights of the kernel, the second region being different from the first region, and the generating of the output feature map may include generating a first partial output feature map by accumulating the first output values at the positions in the first partial output feature map that is based on the positions of the respective weights in the kernel and accumulating the first partial output feature map on the output feature map, and generating a second partial output feature map by accumulating the second output values at the positions in the second partial output feature map that is based on the positions of the respective weights in the kernel and accumulating the second partial output feature map on the output feature map.

The generating of the output values may include skipping an operation between the input feature map and the first weight, in response to the first weight of the kernel being zero.

The generating of the output values may include performing an operation between the each of the weights of the kernel and a compressed input feature map by continuously stream-reading the compressed input feature map.

The method may include generating partial output feature maps by performing an operation between a different region from among regions of the input feature map and the kernel, and generating each of the regions of the output feature map by accumulating one or more partial output feature map from among the partial output feature maps.

The generating of the partial output feature maps may include generating the partial output feature maps by performing an operation between a region from among the regions of the input feature map and each of a plurality of kernels.

In another general aspect, there is provided a neural network apparatus including a memory configured to store weights of a kernel and instructions, and a processor configured to execute the instructions to generate first output values by performing an operation between a first region of an input feature map and the weights, locate the first output values at positions in a first partial output feature map that are based on respective positions of the weights in the kernel, generate second output values by performing an operation between a second region of the input feature map and the weights, and locate the second output values at positions in a second partial output feature map that are based on respective positions of the weights in the kernel.

The processor may be configured to generate the second output values by performing an operation between the weights and a portion of the second region different than the first region.

The processor may be configured to skip an operation between the first region or the second region of the input feature map and the weights, in response to a weight of the weights being zero.

Other features and aspects will be apparent from the following detailed description, the drawings, and the claims.

BRIEF DESCRIPTION OF THE DRAWINGS

FIGS. 2A, 2B, and 2C are diagrams illustrating examples for describing examples of a convolution operation in a neural network.

Figure 1:
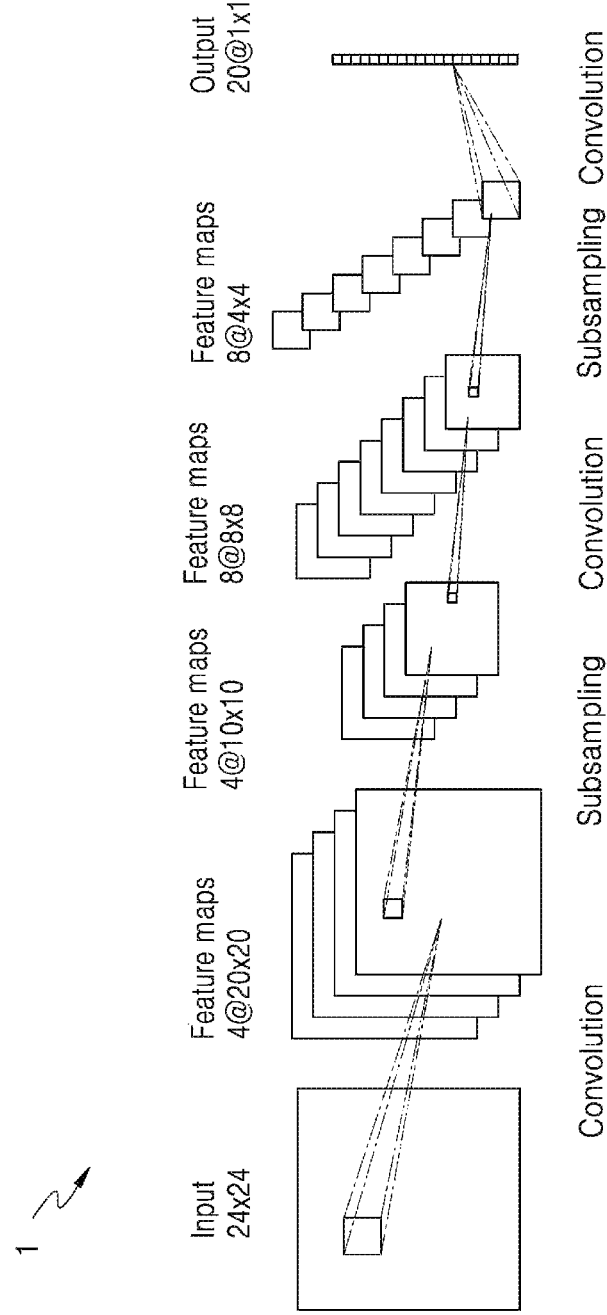
FIG. 1 is a diagram illustrating an example of an architecture of a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, expressions, for example, "between" and "immediately between," and "adjacent to" and "immediately adjacent to" may also be construed as described in the foregoing. As used herein, the term "and/or" includes any one and any combination of any two or more of the associated listed items. In addition, unless explicitly described to the contrary, the word "comprise" and variations such as "comprises" or "comprising" will be understood to imply the inclusion of stated elements but not the exclusion of any other elements.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof. Throughout the disclosure, the expression "at least one of a, b or c" indicates only a, only b, only c, both a and b, both a and c, both b and c, all of a, b, and c, or variations thereof. The use of the term 'may' herein with respect to an example or embodiment, e.g., as to what an example or embodiment may include or implement, means that at least one example or embodiment exists where such a feature is included or implemented while all examples and embodiments are not limited thereto.

FIG. 1 is a diagram illustrating an example for describing the architecture of a neural network 1.

Referring to FIG. 1, the neural network 1 may be architecture of a deep neural network (DNN) or an n-layer neural network. The DNN or n-layer neural network may correspond to neural networks such as, for example, a convolutional neural network (CNN), a recurrent neural network (RNN), a deep belief network, a restricted Boltzman machine, a fully-connected network (FCN), a deep convolutional network (DCN), a long-short term memory (LSTM) network, and a grated recurrent units (GRUs). For example, the neural network 1 may be embodied as a CNN, but is not limited thereto. In FIG. 1, some convolution layers of a CNN corresponding to an example of the neural network 1 is illustrated, but the CNN may further include, in addition to the illustrated convolution layers, a pooling layer or a fully connected layer.

The neural network 1 may be implemented as an architecture having a plurality of layers including an input image, feature maps, and an output. In the neural network 1, a convolution operation is performed on the input image with a filter referred to as a kernel, and as a result, the feature maps are output. The convolution operation is performed again on the output feature maps as input feature maps, with a kernel, and new feature maps are output. When the convolution operation is repeatedly performed as such, a recognition result with respect to features of the input image may be finally output through the neural network 1.

For example, when an input image having a 24×24 pixel size is input to the neural network 1 of FIG. 1, the input image may be output as feature maps of four channels each having a 20×20 pixel size, through a convolution operation with a kernel. Then, sizes of the 20×20 feature maps may be reduced through the repeated convolution operations with the kernel, and finally, features each having a 1×1 pixel size may be output. In the neural network 1, a convolution operation and a sub-sampling (or pooling) operation may be repeatedly performed in several layers so as to filter and output robust features, which may represent the entire input image, from the input image, and derive the recognition result of the input image through final features that are output.

In another example, the neural network 1 may receive an input source sentence, (e.g., voice entry) instead of an input image. In such an example, a convolution operation is performed on the input source sentence with a kernel, and as a result, the feature maps are output. The convolution operation is performed again on the output feature maps as input feature maps, with a kernel, and new feature maps are output. When the convolution operation is repeatedly performed as such, a recognition result with respect to features of the input source sentence may be output through the neural network 1.

Figure 2C:
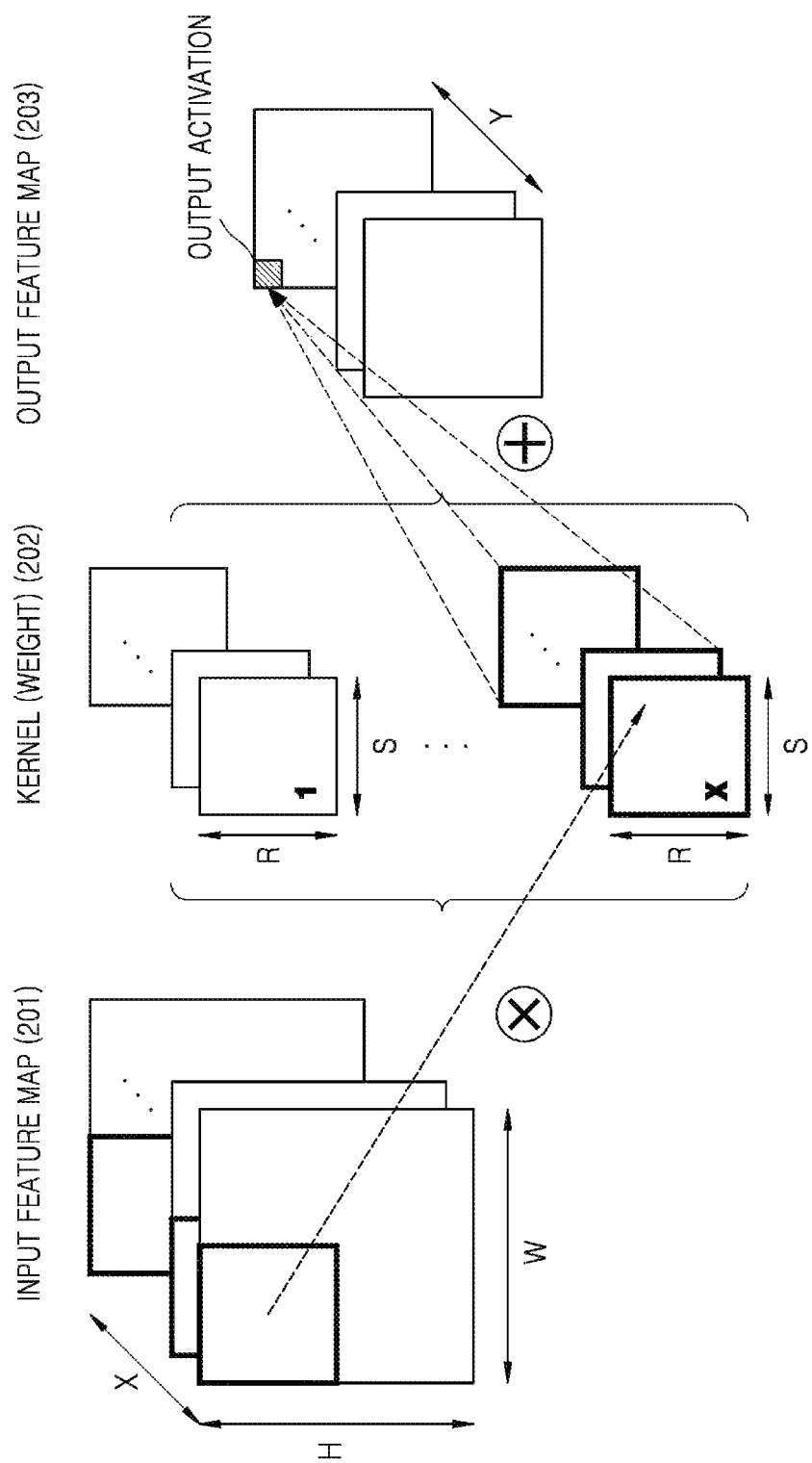

FIGS. 2A, 2B, and 2C are diagrams illustrating examples of a convolution operation in a neural network.

In FIG. 2A, an input feature map 210 has a 6×6 pixel size, a kernel 220 has a 3×3 pixel size, and an output feature map 230 has a 4×4 pixel size, but sizes are not limited thereto, and the neural network may include feature maps and kernels having various sizes. Also, values defined in the input feature map 210, the kernel 220, and the output feature map 230 are only examples, and are not limited thereto.

The kernel 220 performs a convolution operation while sliding on the input feature map 210 in a region (or tile) unit having a 3×3 pixel size. The convolution operation denotes an operation in which each pixel value of the output feature map 230 is obtained by adding all values obtained by multiplying each pixel value of any region of the input feature map 210 by a weight of each element at a corresponding location in the kernel 220. In detail, the kernel 220 may first perform a convolution operation with a first region 211 of the input feature map 210. In other words, pixel values of 1, 2, 3, 4, 5, 6, 7, 8, and 9 of the first region 211 are respectively multiplied by weights of −1, −3, +4, +7, −2, −1, −5, +3, and +1 of elements of the kernel 220, and as a result, values of −1, −6, 12, 28, −10, −6, −35, 24, and 9 are obtained. Then, the values of 1, −6, 12, 28, −10, −6, −24, and 9 are added to obtain a value of 15, and accordingly, a pixel value 231 of a first row and a first column of the output feature map 230 is determined to be the value of 15. The pixel value 231 of the first row and the first column of the output feature map 230 corresponds to the first region 211. Similarly, a convolution operation is performed between a second region 212 of the input feature map 210 and the kernel 220, and thus a pixel value 232 of the first row and a second column of the output feature map 230 is determined to be 4. Finally, a convolution operation is performed between a sixteenth region 213, i.e., a last window of the input feature map 210, and the kernel 220, and thus a pixel value 233 of a fourth row and a fourth column of the output feature map 230 is determined to be 11.

In other words, a convolution operation between one input feature map 210 and one kernel 220 may be processed by repeatedly performing multiplication of values of elements of the input feature map 210 by values of elements of the kernel 220, which correspond to each other, and addition of multiplication results, and the output feature map 230 is generated as a result of the convolution operation.

In FIG. 2B, an input feature map 250 has a 1×1 pixel size, an original kernel 260 has a 3×3 pixel size, and an output feature map 270 has a 3×3 pixel size, but sizes are not limited thereto, and the neural network may include feature maps and kernels having various sizes with various values.

The kernel 260 performs a convolution operation while sliding on the input feature map 250 in a region (or tile) unit having a 3×3 pixel size. In detail, the kernel 220 may first perform a convolution operation with a first region 251 of the input feature map 250. That is, a sole pixel value of the first region 251, 9, is multiplied by a weight of the kernel 260, +1, and a pixel value 271 of a first row and a first column of the output feature map 270 is determined to be a product of 9.

Similarly, a convolution operation is performed between a second region 252 of the input feature map 250 and the kernel 260, and thus a pixel value 272 of the first row and a second column of the output feature map 270 is determined to be 27. Finally, a convolution operation is performed between the last region of the input feature map 250, a ninth region 253, and the kernel 260, and thus a pixel value 273 of a third row and a third column of the output feature map 270 is determined to be −9.

Meanwhile, a two-dimensional (2D) convolution operation has been described with reference to FIGS. 2A and 2B, but a convolution operation may correspond to a three-dimensional (3D) convolution operation, wherein input feature maps, kernels, and output feature maps of a plurality of channels exist, as will be described with reference to FIG. 2C.

Referring to FIG. 2C, there are X channels in input feature maps 201, and the input feature map 201 of each channel may have a size of H rows and W columns, wherein X, W, and H are each a natural number. Each of kernels 202 may have a size of R rows and S columns, and have the number of channels corresponding to the number X of channels of the input feature maps 201 and the number Y of channels of output feature maps 203, wherein R, S, and Y are each a natural number. The output feature maps 203 are generated via a 3D convolution operation between the input feature maps 201 and the kernels 202, and Y channels may exist in the output feature maps 203 via the 3D convolution operation.

A process of generating an output feature map via a convolution operation between one input feature map and one kernel is as described above with reference to FIG. 2A, and the 2D convolution operation described in FIG. 2A is repeatedly performed between the input feature maps 201 of all channels and the kernels 202 of all channels to generate the output feature maps 203 of all channels.

Figure 3:
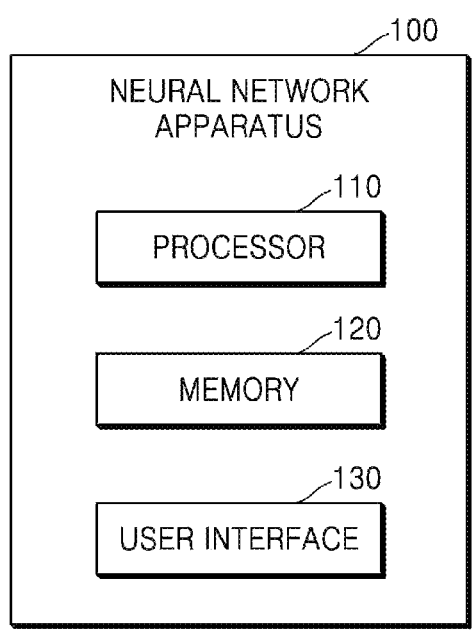
FIG. 3 is a diagram illustrating an example of a hardware configuration of a neural network apparatus.

FIG. 3 is a diagram illustrating an example of a neural network apparatus 100.

The neural network apparatus 100 may be embodied as any one of various types of devices, such as, for example, a server, a mobile device, a smart phone an embedded device, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, electronic product, for example, a robot, a digital camera, a digital video camera, a portable game console, an MP3 player, a portable/personal multimedia player (PMP), a handheld e-book, a global positioning system (GPS) navigation, a personal navigation device, portable navigation device (PND), a handheld game console, an e-book, a television (TV), a high definition television (HDTV), a smart TV, a smart appliance, a smart home device, or a security device for gate control, voice authentication systems, an augmented reality (AR) device, an Internet of Things (IoT) device, an autonomous vehicle, a robotic device, or a medical device, which performs voice recognition, image recognition, and image classification using a neural network, but is not limited thereto. The examples described herein may be applicable to vehicles and vehicle management systems such as, for example, an autonomous vehicle, an automatic or autonomous driving system, an intelligent vehicle, an advanced driver assistance system (ADAS), a navigation system to assist a vehicle with safely maintaining a lane on which the vehicle is travelling. The examples described herein may be used for road guidance information in a navigation device of a vehicle, such as, for example, an augmented reality head-up display (AR 3D HUD). Furthermore, the neural network apparatus 100 may be a dedicated hardware accelerator mounted in the above-mentioned devices, and the neural network apparatus 100 may be a hardware accelerator, such as, for example, a neural processing unit (NPU), a tensor processing unit (TPU), a neural engine, which is a dedicated module for driving a neural network, although not limited thereto. The examples described above are non-limiting, and other examples such as, for example, training, gaming, applications in healthcare, public safety, tourism, and marketing are considered to be well within the scope of the present disclosure. These devices perform one or more functions such as, for example, voice recognition, image recognition, and image classification.

Referring to FIG. 3, the neural network apparatus 100 includes a processor 110, a memory 120, and a user interface 130. The memory 120, the processor 110, and the user interface 130 may be connected via a system bus or other suitable circuitry. In FIG. 3, only components of the neural network apparatus 100 related to the current embodiment are illustrated. Accordingly, the neural network apparatus 100 may include general-purpose components other than those shown in FIG. 3.

The processor 110 controls overall functions for executing the neural network apparatus 100 in a neural network. For example, the processor 110 may control the neural network apparatus 100 in general by executing programs stored in the memory 120 of the neural network apparatus 100. The processor 110 is included in or includes at least one of the apparatuses described with reference to FIGS. 4-6 and 8-15 or performs at least one of the methods described with reference to FIG. 16. The processor 110 refers to a data processing device configured as hardware with a circuitry in a physical structure to execute desired operations. For example, the desired operations may include codes or instructions included in a program. For example, the processor 110 may be embodied as a microprocessor, a processor core, a multicore processor, a multiprocessor, a central processing unit (CPU), a graphics processing unit (GPU), an application processor (AP), an application-specific integrated circuit (ASIC), and a field programmable gate array (FPGA) included in the neural network apparatus 100, but is not limited thereto. Also, the processor 110 may execute programs stored in the memory 120 to control all operations of the neural network apparatus 100. For example, the processor 110 may be implemented as a microprocessor (MCU) in which a CPU, a memory (Read Only Memory (ROM) or Radom Access Memory (RAM)), etc. are installed in a single chip, although not limited thereto. Further details regarding the processor 110 are provided below.

The memory 120 is hardware storing various types of data processed in the neural network apparatus 100, and the memory 120 may store data processed or to be processed by the neural network apparatus 100. Also, the memory 120 may store applications or drivers to be driven by the neural network apparatus 100. The memory 120 may include random-access memory (RAM), such as dynamic random-access memory (DRAM) or static random-access memory (SRAM), read-only memory (RAM), electrically erasable programmable read-only memory (EEPROM), a CD-ROM, a Blu-ray disk, optical disk storage, a hard disk drive (HDD), a solid state drive (SSD), or a flash memory. Further details regarding the memory 120 are provided below.

The user interface 130 is a physical structure that includes one or more hardware components that provide the ability to render a user interface, render a display, outputs information, and/or receive user input. The user interface 130 outputs the result that it receives from the neural network apparatus 100. However, the user interface 130 is not limited to the example described above, and in an example, any displays, such as, for example, computer monitor and eye glass display (EGD) that are operatively connected to the neural network apparatus 100 may be used without departing from the spirit and scope of the illustrative examples described.

The processor 110 may include operation units performing a convolution operation and an on-chip memory performing a cache function.

The processor 110 processes a convolution operation between an input feature map and a kernel using pixel values of input feature maps and weights of kernels stored (or buffered) in the on-chip memory from the memory 120. The processor 110 may include at least one operation unit and at least one on-chip memory, and a convolution operation may be efficiently performed as each of the at least one operation unit and each of the at least one on-chip memory are used to independently perform the convolution operation in parallel.

A logic circuit for a convolution operation may be included in an operation unit of the processor 110. That is, an operation unit of the processor 110 may include an operator implemented with a combination of a multiplier, an adder, and an accumulator. The multiplier may include a combination of sub-multipliers, and the adder may also include a combination of sub-adders.

The operation unit of the processor 110 may include a dispatcher that dispatches various operands, such as pixel values of input feature maps and weights of kernels, to the convolution operator. The dispatcher dispatches, to the on-chip memory, operands, such as pixel values and weights required by the operation unit to perform the convolution operation, from data of pixel values of input feature maps and weights of kernels, wherein the data is stored in the memory 120. Then, the dispatcher dispatches the operands dispatched to the on-chip memory again to a processing unit in an operation unit for the convolution operation.

The processor 110 may generate an output feature map by performing a convolution operation between an input feature map and a kernel. For an efficient convolution operation, the processor 110 may generate output values by performing an operation between each of weights of the kernel and the input feature map. The processor 110 may perform the operation between the input feature map and each weight of the kernel by reusing the input feature map. In an example, the processor 110 may generate first output values by multiplying each of pixel values of the input feature map by a first weight of the kernel, and may generate second output values by multiplying each pixel value of the input feature map by a second weight of the kernel.

The processor 110 may generate the output feature map by accumulating output values at positions in the output feature map set based on the positions of the weights in the kernel. The processor 110 may generate the output feature map filled with the output values by accumulating the output values at the positions in the output feature map. The processor 110 may configure the positions at which the output values are to be accumulated in the output feature map, based on the positions of the weights in the kernel. For example, the processor 110 may configure a position at which first output values are to be accumulated in the output feature map, based on a position of a first weight in the kernel, and a position at which second output values are to be accumulated in the output feature map, based on a position of a second weight in the kernel. In an example, the processor 110 may configure in advance the positions at which the output values are to be accumulated in the output feature map, before performing the operation between the input feature map and the kernel. Thus, the processor 110 may generate the output feature map by accumulating the first output values at the position in the output feature map set based on the first weight and accumulating the second output values at the position in the output feature map set based on the second weight.

When the processor 110 generates the output feature map by reusing the input feature map read from the memory 120 every cycle in the convolution operation, the processor 110 may minimize the number of times the input feature map is read from the memory 120 to one regardless of a size of the kernel.

The processor 110 may skip an operation between the input feature map and the first weight in the case that the first weight of the kernel is zero. In an example, when the processor 110 sequentially performs an operation between each of the weights of the kernel and the input feature map every cycle, the operation between the input feature map and the zero first weight may be skipped. Thus, the processor 110 may reduce a time required for the convolution operation between the input feature map and the kernel by as many cycles as a zero weight.

Figure 4:
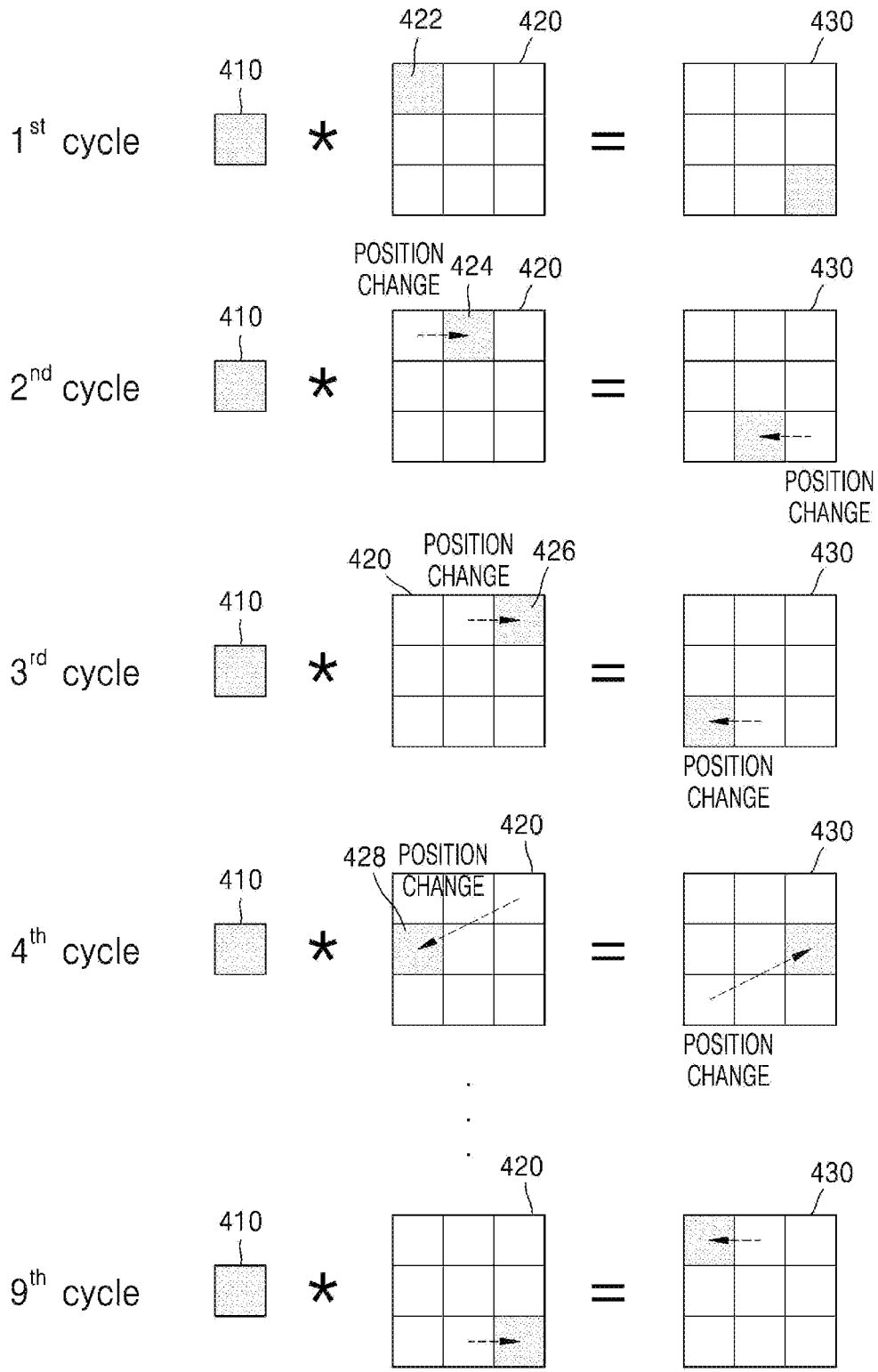
FIG. 4 is a diagram illustrating an example in which a processor generates an output feature map reusing an input feature map.

FIG. 4 illustrates an example in which a processor generates an output feature map by reusing an input feature map.

In FIG. 4, for convenience, an input feature map 410 is illustrated as a 1×1 pixel region and a kernel 420 is illustrated as a 3×3 pixel region, but the input feature map and the kernel may be regions having different sizes, without being limited to the illustration.

In a $1^{st}$ cycle, the processor 110 may generate a first output value by performing an operation between the input feature map 410 and a first weight 422 of the kernel 420. In an example, the processor 110 may generate the first output value by performing a multiplication operation between a pixel value of the input feature map 410 and the first weight 422 of the kernel 420. The processor 110 may accumulate the first output value at a position in an output feature map 430 set based on a position of the first weight 422 in the kernel 420. A position in an output feature map 430, which corresponds to the position of the first weight 422 in the kernel 420, may be set to a third row and a third column of the output feature map 430. Thus, the processor 110 may accumulate the first output value to the third row and the third column of the output feature map 430.

In a $2^{nd}$ cycle, the processor 110 may generate a second output value by performing an operation between the input feature map 410 and a second weight 424 of the kernel 420. The processor 110 may accumulate the second output value at a position in the output feature map 430 set based on a position of the second weight 424 in the kernel 420. A position in the output feature map 430, which corresponds to the position of the second weight 424 in the kernel 420, may be set to a third row and a second column of the output feature map 430. That is, as a position of a weight, which is an operand, changes to the right by one block from the first weight 422 to the second weight 424, a position in the output feature map 430 for accumulating an output value may change by one block to the left from the third row and the third column to the third row and the second column. Thus, the processor 110 may accumulate the second output value to the third row and the second column of the output feature map 430.

In a $3^{rd}$ cycle, the processor 110 may generate a third output value by performing an operation between the input feature map 410 and a third weight 426 of the kernel 420, and accumulate the third output value in the third row and a first column of the output feature map 430. In a $4^{th}$ cycle, the processor 110 may generate a fourth output value by performing an operation between the input feature map 410 and a fourth weight 428 of the kernel 420, and accumulate the fourth output value in the second row and the third column of the output feature map 430. Likewise, in $5^{th}$ through $9^{th}$ cycles, the processor 110 may generate output values by performing an operation between each weight of the kernel 420 and the input feature map 410. The processor 110 may generate the output feature map 430 filled with the output values by accumulating the output values in positions of the output feature map 430 corresponding to positions of the weights of the kernel 420.

For convenience, it is illustrated in FIG. 4 that an operation between each weight of the kernel 420 and the input feature map 410 is performed in a total of nine cycles, but an operation between a zero weight and the input feature map 410 may be skipped. That is, the processor 110 may perform an operation between each weight of the kernel 420 and the input feature map 410 as many times as the number of non-zero weights of the kernel 420.

Thus, as shown in FIGS. 2A and 2B, the processor 110 may perform the convolution operation by reusing the input feature map every cycle while previously setting the position to accumulate the output value on the output feature map based on the position of the weight in the kernel, instead of performing the convolution operation while reading the input feature map including an overlapping region several times, thereby the convolution operation may be performed efficiently.

Referring to FIG. 3, the processor 110 may generate the first output values by performing an operation between each of weights in the kernel and the first region based on the reuse of the first region in the input feature map. The processor 110 may generate a first partial output feature map by accumulating the first output values at the positions in the first partial output feature map set based on the positions of the weights in the kernel. The processor 110 may then accumulate the first partial output feature map on the output feature map. The processor 110 may set a position to accumulate the first partial output feature map in the output feature map based on the position of the first region in the input feature map, and accumulate the first partial output feature map at the set position.

The processor 110 may generate the second output values by performing an operation between each of weights in the kernel and the second region based on the reuse of the second region that is different from the first region in the input feature map. The processor 110 may generate a second partial output feature map by accumulating the second output values at the positions in the second partial output feature map set based on the positions of the weights in the kernel. The processor 110 may then accumulate the first partial output feature map on the output feature map. The processor 110 may set a position to accumulate the second partial output feature map in the output feature map based on the position of the second region in the input feature map, and accumulate the second partial output feature map at the set position.

Likewise, the processor 110 may generate an $N^{th}$ partial output feature map by performing an operation between each of the weights in the kernel and an $N^{th}$ region based on the reuse of the $N^{th}$ region that is different from the first region and the second region in the input feature map, in which N is a natural number greater than or equal to 3. Thus, the processor 110 may generate the output feature map by accumulating the first through $N^{th}$ partial output feature maps on the output feature map.

The processor 110 may include a multiplier MUL corresponding to each of pixels in a region of the input feature map and a multiplexer MUX, an adder, and an accumulator & register ("Acc. Register") that corresponds to pixels of a partial output feature map, respectively, to generate the partial output feature map.

The processor 110 may configure a region in various forms in the input feature map and generate the partial output feature map by performing an operation between the configured region and the kernel. The region in various forms may include n pixels, n×m pixels, or n×m×l pixels, in which n, m, and l may be natural numbers greater than or equal to 1. The input feature map may be a two-dimensional (2D) input feature map or a three-dimensional (3D) input feature map, and a region of the input feature map may be a 2D region or a 3D region.

The processor 110 may generate the partial output feature map by performing the operation between the region of the input feature map and the partial region of the kernel. By limiting the operation to the partial region of the kernel, the processor 110 may reduce a size of the partial output feature map, thus reducing a size of a buffer for the partial output feature map. For example, when the region of the input feature map has a size of 1×10 pixels and the kernel has a size of 3×3 pixels, the partial output feature map that is the operation result may have a region of 3×12 pixels. In this case, by limiting the size of the kernel to the 1×3 pixels, the processor 110 may perform the convolution operation such that the partial output feature map has a region of 1×12 pixels and thus the size of the buffer for the partial output feature map may be reduced.

Figure 5:
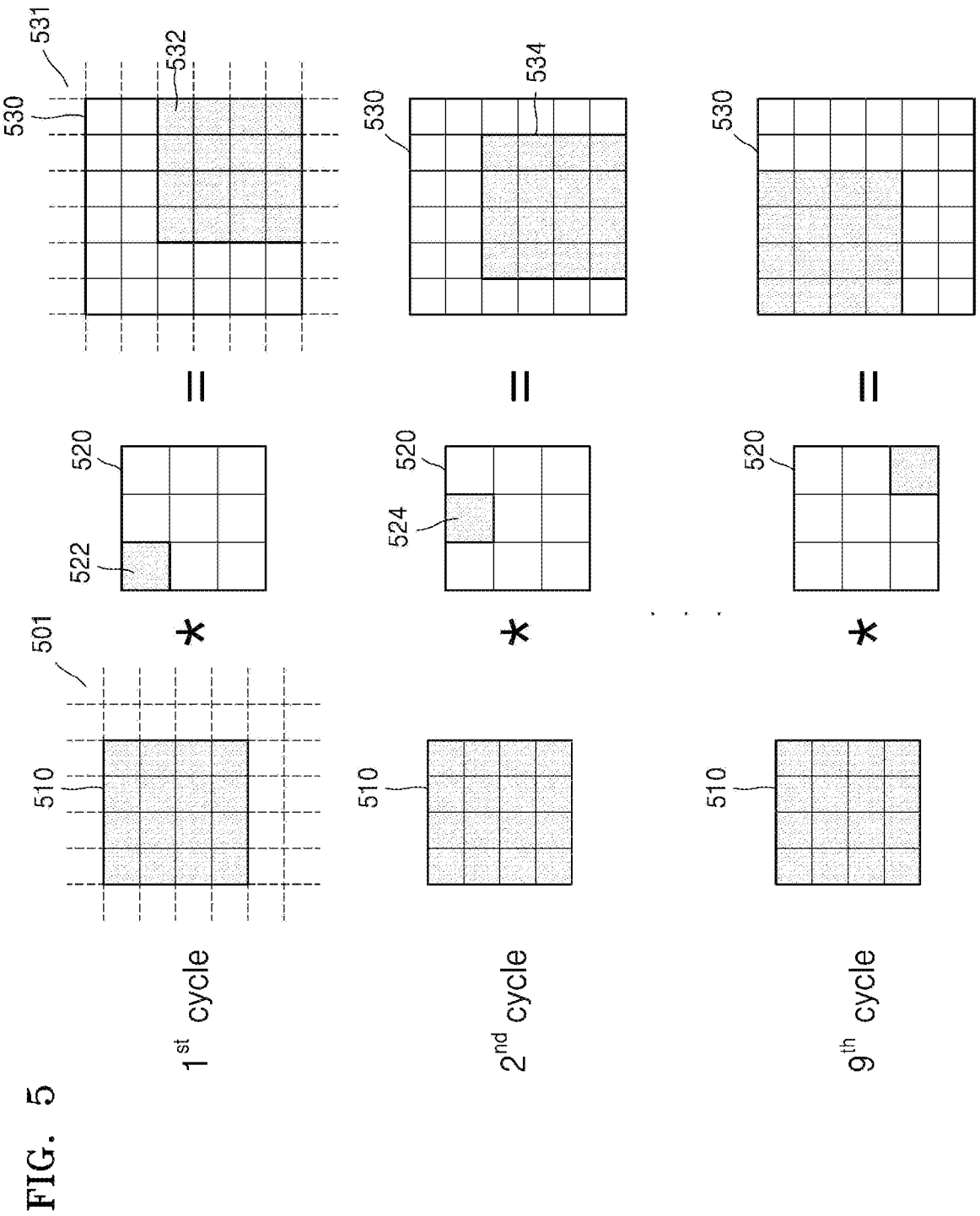
FIG. 5 is a diagram illustrating an example in which a processor generates a partial output feature map reusing a region of an input feature map.

FIG. 5 illustrates an example in which a processor generates a partial output feature map by reusing a region of an input feature map.

In FIG. 5, for convenience, a first region 510 of an input feature map 501 is illustrated as a 4×4 pixel region and a kernel 520 is illustrated as a 3×3 pixel region, but the first region of the input feature map and the kernel may be regions having different sizes, without being limited to the illustration.

In a $1^{st}$ cycle, the processor 110 may generate first output values by performing an operation between the first region 510 and a first weight 522 of the kernel 520. In an example, the processor 110 may generate the first output values by performing a multiplication operation between each of pixel values of the first region 510 and the first weight 522. The processor 110 may generate sixteen first output values by performing a multiplication operation between each of the sixteen pixel values of the first region 510 and the first weight 522. The processor 110 may accumulate the first output values at positions in a first partial output feature map 530 set based on a position of the first weight 522 in the kernel 520. Positions in the first partial output feature map 530, which correspond to the position of the first weight 522 in the kernel 520, may form a region 532 of the first partial output feature map 530. Thus, the processor 110 may accumulate the first output values in the region 532 of the first partial output feature map 530. That is, the processor 110 may accumulate a product of pixel values of n rows and m columns of the first region 510 and the first weight 522 in the region 532 of the first partial output feature map 530, in which n and m are natural numbers.

In a $2^{nd}$ cycle, the processor 110 may generate second output values by performing an operation between the first region 510 and a second weight 524 of the kernel 520. The processor 110 may accumulate the second output values at positions in the first partial output feature map 530 set based on a position of the second weight 524 in the kernel 520. Positions in the first partial output feature map 530, which correspond to the position of the second weight 524 in the kernel 520, may form a region 534 of the first partial output feature map 530. That is, as a position of a weight, which is an operand, changes to the right by one block from the first weight 522 to the second weight 524, a region in the first partial output feature map 530 for accumulating output values may change by one block to the left from the region 532 to the region 534. Thus, the processor 110 may accumulate the second output values in the region 534 of the first partial output feature map 530.

Likewise, in $3^{th}$ through $9^{th}$ cycles, the processor 110 may generate output values by performing an operation between each weight of the kernel 520 and the first region 510. The processor 110 may generate the first partial output feature map 530 by accumulating output values in regions of the first partial output feature map 530 corresponding to positions of the weights of the kernel 520.

The processor 110 may accumulate the generated first partial output feature map 530 on an output feature map 531. The processor 110 may accumulate the first partial output feature map 530 in a position of the output feature map 531 set based on a position of the input feature map 501 of the first region 510.

For an $N^{th}$ region that is different from the first region 510 in the input feature map 501, the processor 110 may generate output values by performing an operation between each of weights of the kernel 520 and the $N^{th}$ region based on the reuse of the $N^{th}$ region, and generate an $N^{th}$ partial output feature map by accumulating output values at positions in the $N^{th}$ partial output feature map set based on positions of weights in the kernel 520. The processor 110 may accumulate the generated $N^{th}$ partial output feature map on the output feature map 531. The processor 110 may generate the output feature map 531 by accumulating the first partial output feature map through the $N^{th}$ partial output feature map on the output feature map 531. In other words, the processor 110 may generate the output feature map 531 filled with output values of the first partial output feature map through the $N^{th}$ partial output feature map. For convenience, it is illustrated in FIG. 5 that an operation between each weight of the kernel 520 and the first region 510 is performed in a total of nine cycles, but an operation between a zero weight and the first region 510 may be skipped. That is, the processor 110 may perform an operation between each weight of the kernel 520 and the first region 510 as many times as the number of non-zero weights of the kernel 520.

Figure 6:
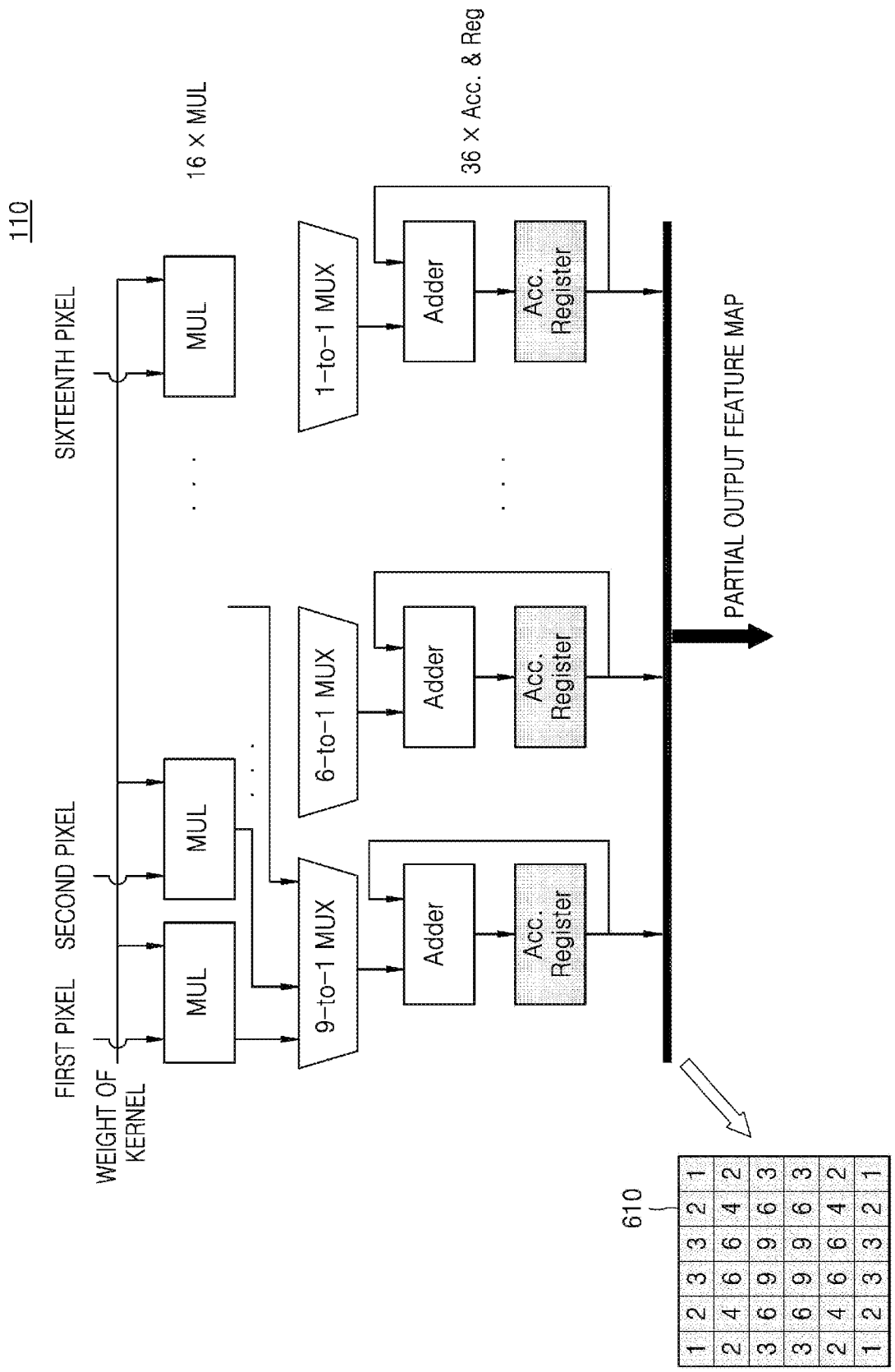
FIG. 6 is a diagram illustrating an example in which a processor generates a partial output feature map.

FIG. 6 illustrates an example in which a processor generates a partial output feature map.

In FIG. 6, the processor 110 may include sixteen multipliers (MUL), thirty six multiplexers (MUX), thirty six adders (Adder), and thirty six accumulators & registers (Acc. Register) to generate the first partial output feature map 530 of FIG. 5.

Each of the sixteen multipliers may correspond to each of pixels of the first region 510 of FIG. 5. To each of the sixteen multipliers, a weight of the kernel 520 and each of the pixels of the first region 510 may be input. For example, a first weight of the kernel 520 and a first pixel of the first region 510 may be input to a first multiplier, the first weight of the kernel 520 and a second pixel of the first region 510 may be input to a second multiplier, and the first weight of the kernel 520 and a sixteenth pixel of the first region 510 may be input to a sixteenth multiplier. In each of the nine cycles, the first through ninth weights of the kernel 520 may be sequentially input to sixteen multipliers, respectively, and each of the pixels of the first region 510 may be repeatedly input. Thus, in each of the nine cycles, the sixteen multipliers may perform a multiplication operation between each of the weights of the kernel 520 and the first region 510 and thus output values.

In an example, each of the thirty six multiplexers, adders, and accumulators & registers may correspond to each of the thirty six pixels of the first partial output feature map 530. That is, one set of a multiplexer, an adder, and an accumulator & register may correspond to any one of the thirty six pixels. Each of the thirty six multiplexers may receive a preset number of output values from among the output values of the sixteen multipliers.

In FIG. 6, 610 indicates the number of output values accumulated for each of the thirty six pixels of the first partial output feature map 530. For example, one output value may be accumulated in a pixel value of a first row and a first column of the first partial output feature map 530, but nine output values may be accumulated in a pixel value of a third row and a third column of the first partial output feature map 530. The number of output values accumulated for each of the thirty six pixels of the first partial output feature map 530 may mean the number of inputs of a multiplexer. For example, a multiplexer corresponding to a pixel of the third row and the third column of the first partial output feature map 530 may receive, as an input, output values output from nine multipliers.

Each of the thirty six multiplexers may receive a number of output values from among output values of the sixteen multipliers and select one output value from among the number of output values. Each of the thirty six multiplexers may receive output values of a number corresponding to each pixel of the first partial output feature map 530 as indicated by 610, and select one output value based on a position of a weight in the kernel 520. For example, a multiplexer corresponding to the pixel of the third row and the third column of the first partial output feature map 530 may receive nine output values from the first row and the first column to the third row and the third column of a region output as a result of an operation between the first region 510 and the weight in the kernel 520. In the operation between the first region 510 and the first weight 522 in the kernel 520, the multiplexer may select an output value of the first row and the first column from among the nine output values in the region 532 based on a position of the first weight 522 in the kernel 520. In the operation between the first region 510 and the second weight 524 in the kernel 520, the multiplexer may select an output value of the first row and the second column from among the nine output values in the region 534 based on a position of the second weight 524 in the kernel 520.

Each of the thirty six adders and accumulators & registers may accumulate output values selected from each of the thirty six multiplexers. Thus, each of the thirty six accumulators & registers may generate the first partial output feature map 530 configured with thirty six pixel values as a result of accumulation of the output values in a total of nine cycles.

Figure 7:
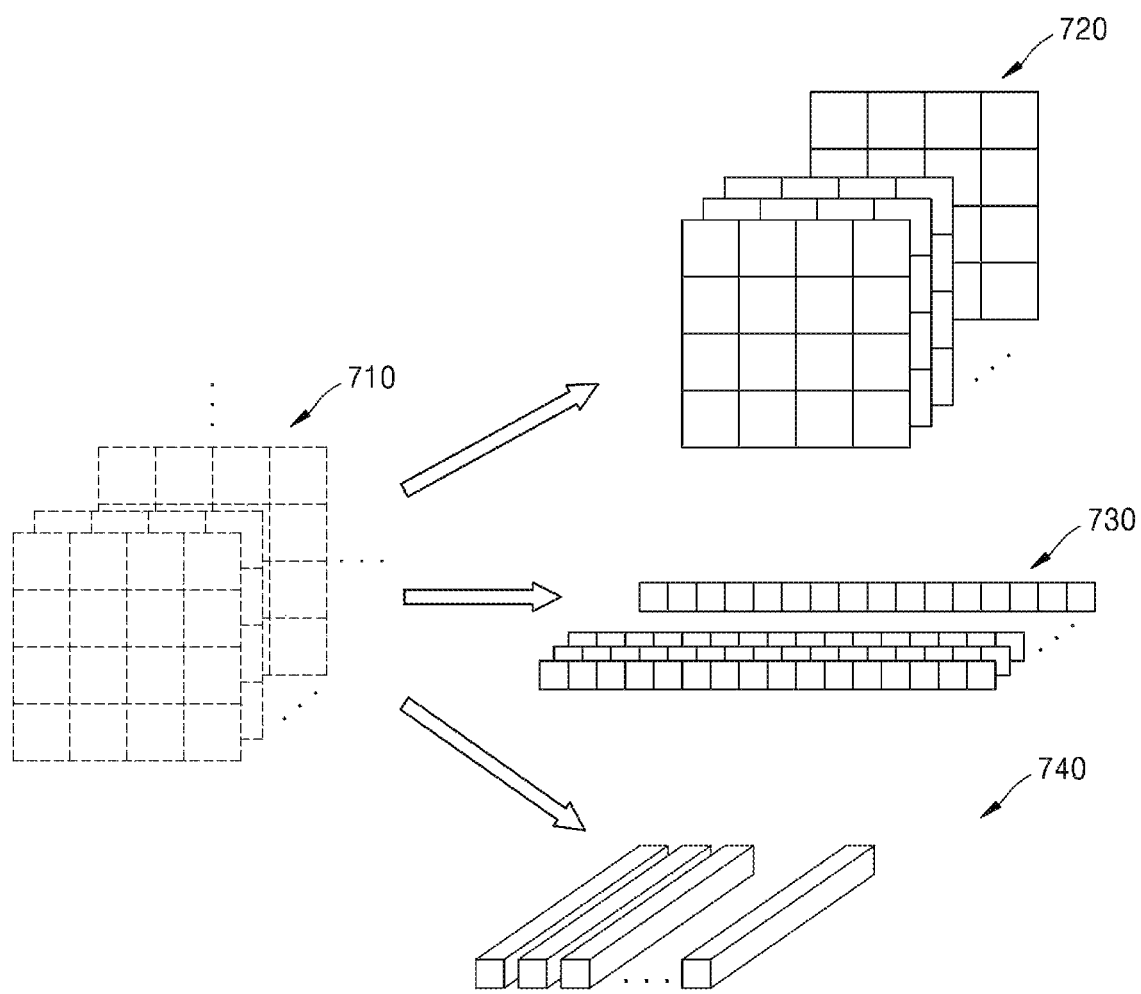
FIG. 7 is a diagram illustrates an example of regions in various forms of an input feature map for an operation with a kernel.

FIG. 7 illustrates an example of regions in various forms of an input feature map for an operation with a kernel.

The processor 110 may configure a region in various forms in an input feature map 710 and generate a partial output feature map by performing an operation between the configured region and a kernel.

In an example, the processor 110 may generate partial output feature maps for regions 720 through an operation with the kernel by configuring the regions 720 composed of n×n pixels in the input feature map 710, and accumulate the partial output feature maps on an output feature map.

In an example, the processor 110 may generate partial output feature maps for regions 730 through an operation with the kernel by configuring the regions 730 composed of 1×n pixels in the input feature map 710, and accumulate the partial output feature maps on an output feature map. In other words, the processor 110 may configure a region in which input is made only in one direction like the regions 730, rather than the square regions 720 in the input feature map 710.

According to an example, the processor 110 may generate partial output feature maps for regions 740 through an operation with the kernel by configuring the regions 740 composed of 1×1×n pixels in the input feature map 710, and accumulate the partial output feature maps on an output feature map.

Figure 8:
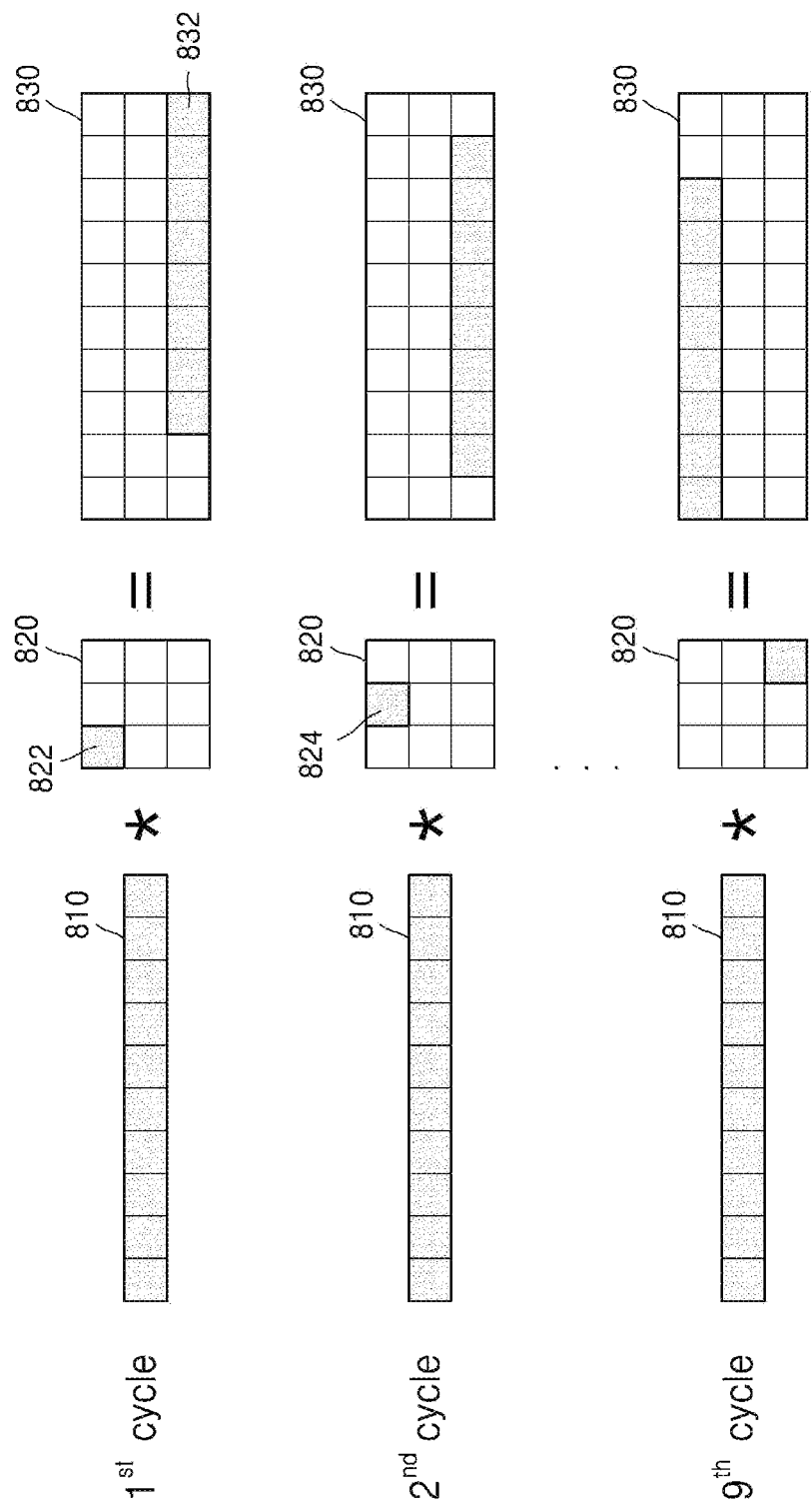
FIG. 8 illustrates an example in which a processor generates a partial output feature map by reusing a region of an input feature map.

FIG. 8 illustrates an example in which a processor generates a partial output feature map by reusing a region of an input feature map.

In FIG. 8, for convenience, a first region 810 of an input feature map is illustrated as a 1×10 pixel region and a kernel 820 is illustrated as a 3×3 pixel region, but the first region of the input feature map and the kernel may be regions having different sizes, without being limited to the illustration.

In a $1^{st}$ cycle, the processor 110 may generate first output values by performing an operation between the first region 810 and a first weight 822 of the kernel 820, and accumulate the first output values at positions in a first partial output feature map 830 set based on a position of the first weight 822 in the kernel 820. In other words, the processor 110 may accumulate the first output values in a region 832 of the first partial output feature map 830.

In $2^{nd}$ through $9^{th}$ cycles, the processor 110 may generate the first partial output feature map 830 by performing an operation between each weight of the kernel 820 and the first region 810, based on reuse of the first region 810.

Figure 9:
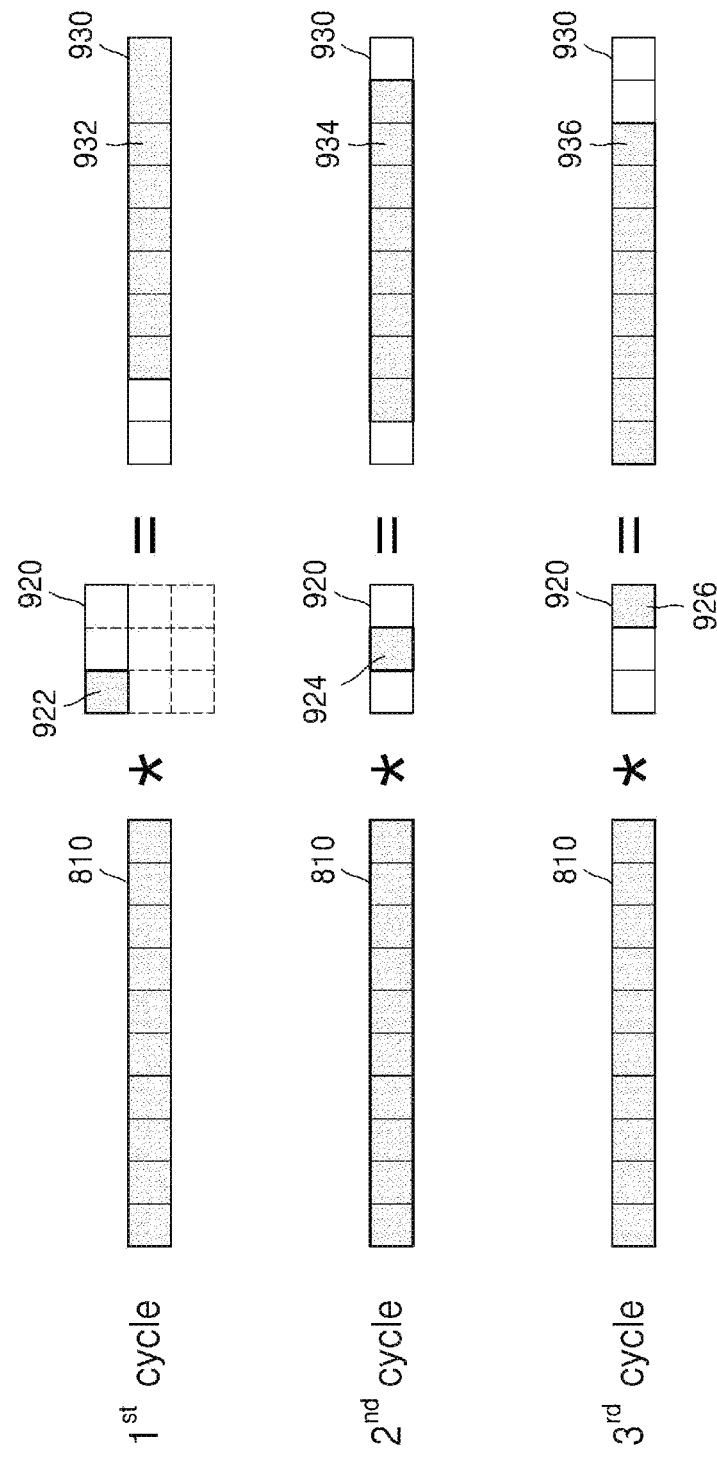
FIG. 9 illustrates an example in which a processor generates a partial output feature map using a part of a kernel.

FIG. 9 illustrates an example in which a processor generates a partial output feature map using a part of a kernel.

By limiting an operation to a partial region 920 of the kernel 820 of FIG. 8, the processor 110 may perform an operation between the first region 810 of the input feature map of FIG. 8 and the partial region 920 of the kernel to generate a partial output feature map 930.

The processor 110 may generate first output values by performing an operation between a first weight 922 of the partial region 920 and the first region 810, and accumulate first output values in a region 932 of the partial output feature map 930. The processor 110 may generate second output values by performing an operation between a second weight 924 of the partial region 920 and the first region 810, and accumulate second output values in a region 934 of the partial output feature map 930. The processor 110 may generate third output values by performing an operation between a third weight of the partial region 920 and the first region 810, and generate the partial output feature map 930 by accumulating the third output values in a region 936 of the partial output feature map 930.

The processor 110 may generate a partial output feature map by performing an operation between another region of the kernel 820 and the first region 810 of the input feature map.

Thus, when compared to FIG. 8, by limiting the operation to the partial region of the kernel, the processor 110 may reduce a size of the partial output feature map, thus reducing a size of a buffer for the partial output feature map, in FIG. 9.

Referring back to FIG. 3, the processor 110 may continuously read an input feature map or a region thereof in the form of a stream and perform a convolution operation with the kernel based on the read input feature map or region thereof. The processor 110 performs the convolution operation with the kernel by reusing the input feature map or the region thereof and thus does not need to read the input feature map again or the region thereof after first reading, thereby continuously reading input feature maps or regions thereof like a continuous stream.

The processor 110 may read a compressed input feature map and perform the convolution operation between the compressed input feature map and the kernel. The input feature map and the compressed input feature map may be stored in the memory 120, and the processor 110 may access the memory 120 to read the compressed input feature map and perform the convolution operation. For example, the processor 110 may store an output feature map, which is a result of the convolution operation, as an input feature map of a next layer in the memory 120. The processor 110 may compress the input feature map or store the compressed input feature map in the memory 120. The processor 110 may read the compressed input feature map from the memory 120 or perform the convolution operation based on the compressed input feature map.

Thus, the processor 110 may perform the convolution operation by reading the compressed input feature map or a region thereof as well as the input feature map like a continuous stream, thereby increasing the speed of the convolution operation.

Figure 10:
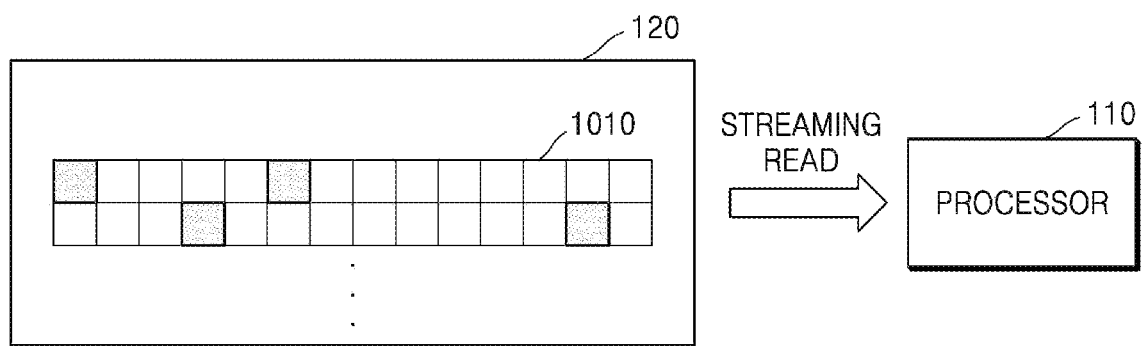
FIG. 10 illustrates an example in which a processor performs a convolution operation by stream-reading a compressed input feature map.

FIG. 10 illustrates an example in which a processor performs a convolution operation by stream-reading a compressed input feature map like a stream.

The memory 120 may store a compressed input feature map 1010 together with an input feature map. The compressed input feature map 1010 may be compressed in the unit of a region of the input feature map. For example, the compressed input feature map 1010 may be compressed in the unit of a 4×4 region. A processor 110 may perform the convolution operation by reading the compressed input feature map 1010 like a continuous stream.

The compressed input feature map 1010 may include non-zero pixels, such that the processor 110 may implement zero skipping by performing the convolution operation between the compressed input feature map 1010 and the kernel, and thus reduce a memory bandwidth.

Figure 11:
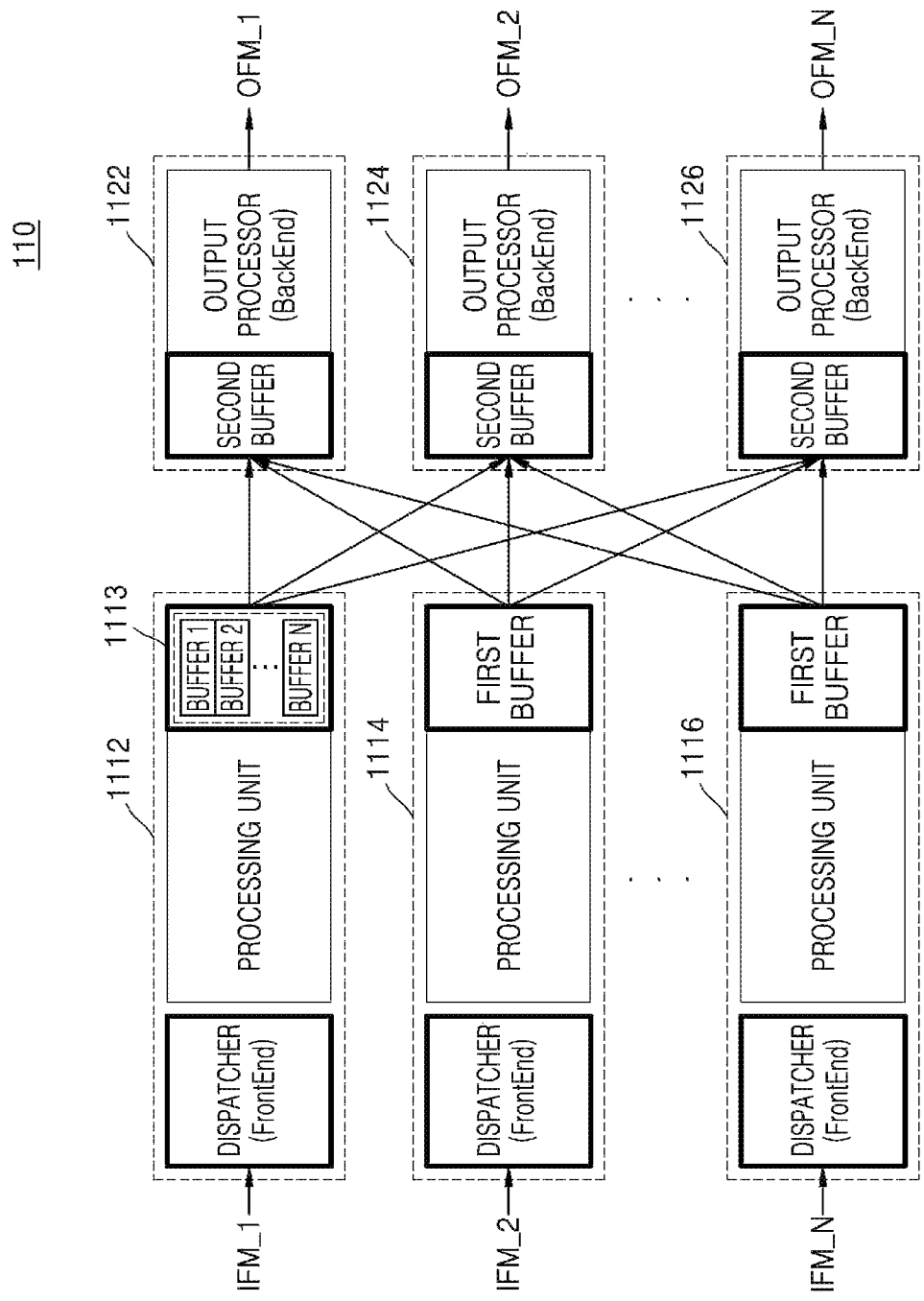
FIG. 11 illustrates an example of a hardware configuration of a processor.

FIG. 11 illustrates an example of a hardware configuration of a processor.

The processor 110 may include operation units 1112, 1114, and 1116 and output units 1122, 1124, and 1126.

Each of the operation units 1112, 1114, and 1116 may generate partial output feature maps by performing an operation between a different region from among regions IFM_1, IFM_2 through IFM_N and the kernel. For example, the first operation unit 1112 may generate the first partial output feature map by performing an operation between the first region IFM_1 and the kernel based on reuse of the first region IFM_1 of the input feature map. In addition, the $N^{th}$ operation unit 1116 may generate the $N^{th}$ partial output feature map by performing an operation between the $N^{th}$ region IFM_N and the kernel based on reuse of the $N^{th}$ region IFM_N of the input feature map.

Each of the operation units 1112, 1114, and 1116 may include a dispatcher located at a front end (FrontEnd), a processing unit, and a first buffer. The dispatcher of the first operation unit 1112 may read the first region IFM_1 of the input feature map from the memory 120 and dispatch the read first region to the processing unit. The processing unit may generate output values by performing an operation between the first region IFM_1 and the kernels. In an example, the processing unit includes various operators such as, for example, the multiplier, the adder, and the accumulator. The processing unit may generate first output values by performing an operation between the first region IFM_1 and a first kernel, generate second output values by performing an operation between the first region IFM_1 and a second kernel, and generate $N^{th}$ output values by performing an operation between the first region IFM_1 and an $N^{th}$ kernel. A first buffer 1113 may then generate first partial output feature maps by accumulating output values. For example, a buffer 1 in the first buffer 1113 may generate a first-first partial output feature map by accumulating first output values generated by the processing unit, a buffer 2 in the first buffer 1113 may generate a first-second partial output feature map by accumulating second output values generated by the processing unit, and a buffer N in the first buffer 1113 may generate a first-$N^{th}$ partial output feature map by accumulating $N^{th}$ output values generated by the processing unit.

Likewise, the other operation units 1114 and 1116 may generate the second through $N^{th}$ partial output feature maps by performing an operation between the kernels and the other regions IFM_2 through IFM_N of the input feature map based on reuse of the other regions IFM_2 through IFM_N of the input feature map through the dispatcher, the processing unit, and the first buffer.

The processing unit included in each of the operation units 1112, 1114, and 1116 may include processing units that are parallelized. For example, the processing unit of the first operation unit 1112 may include a first processing unit that performs an operation between the first region IFM_1 of the input feature map and the first kernel and a second processing unit that performs an operation between the first region IFM_1 and the second kernel. In this case, the first processing unit may perform a part of the operation between the first region IFM_1 of the input feature map and the second kernel instead of the second processing unit, after completing the operation between the first region IFM_1 of the input feature map and the first kernel. As a result, load balancing may be achieved, and a total processing time may be reduced. A detailed example will be described with reference to FIG. 15.

The output units 1122, 1124, and 1126 may generate regions OFM_0, OFM_1 through OFM_N of the output feature map by accumulating a needed partial output feature map from among the partial output feature maps generated from the operation units 1112, 1114, and 1116. The output units 1122, 1124, and 1126 may generate regions OFM_0, OFM_1 through OFM_N of the output feature map and output them to the memory 120.

Each of the output units 1122, 1124, and 1126 may include a second buffer and an output handler located at a backend.

The second buffer of the first output unit 1122 may receive a partial output feature map from each of the operation units 1112, 1114, and 1116, and generate the first region OFM_1 of the output feature map by accumulating the received partial output feature map. For example, the second buffer of the first output unit 1122 may receive the first-first partial output feature map from the buffer 1 of the first operation unit 1112, receive the second-first partial output feature map from the buffer 1 of the second operation unit 1114, and receive the $N^{th}$-first partial output feature map from the buffer 1 of the $N^{th}$ operation unit 1116. The second buffer of the first output unit 1122 may generate the first region OFM_1 of the output feature map by accumulating the received first-first through $N^{th}$-first partial output feature maps. An output processor of the first output unit 1122 may perform pixel processing with respect to the first region OFM_1 of the output feature map and output the first region OFM_1 of the pixel-processed output feature map.

Likewise, the other output units 1124 and 1126 may receive a needed partial output feature map from each of the operation units 1112, 1114, and 1116 through the second buffer and the output processor, and generate the second through $N^{th}$ regions OFM_2 through OFM_N of the output feature map by accumulating the received partial output feature map.

Each of the operation units 1112, 1114, and 1116 may perform an operation with the kernel by reusing different regions of the input feature map, and thus the operation units 1112, 1114, and 1116 may perform independent and parallel operations, respectively. In each of the operation units 1112, 1114, and 1116, the dispatcher may merely dispatch a region of the input feature map to the processing unit on the same operation unit without dispatching the region of the input feature map to the processing unit on another operation unit, thus, reducing complexity at a front end of FrontEnd of the processor 110.

Referring to FIG. 11, in an example, the f operation units 1112, 1114, and 1116 may be fully connected with the output units 1122, 1124, and 1126. Thus, it may incorrectly appear that the complexity of processor 110 at the back end (BackEnd) has increased, together with reduction in the complexity of the processor 110 at the front end FrontEnd. The output units 1122, 1124, and 1126 perform an operation of selectively accumulating partial feature maps from each of the operation units 1112, 1114, and 1116. Thus, the output units 1122, 1124, and 1126 may perform the operation more temporally sparsely than the operation units 1112, 1114, and 1116, without largely increasing complexity.

Figure 12:
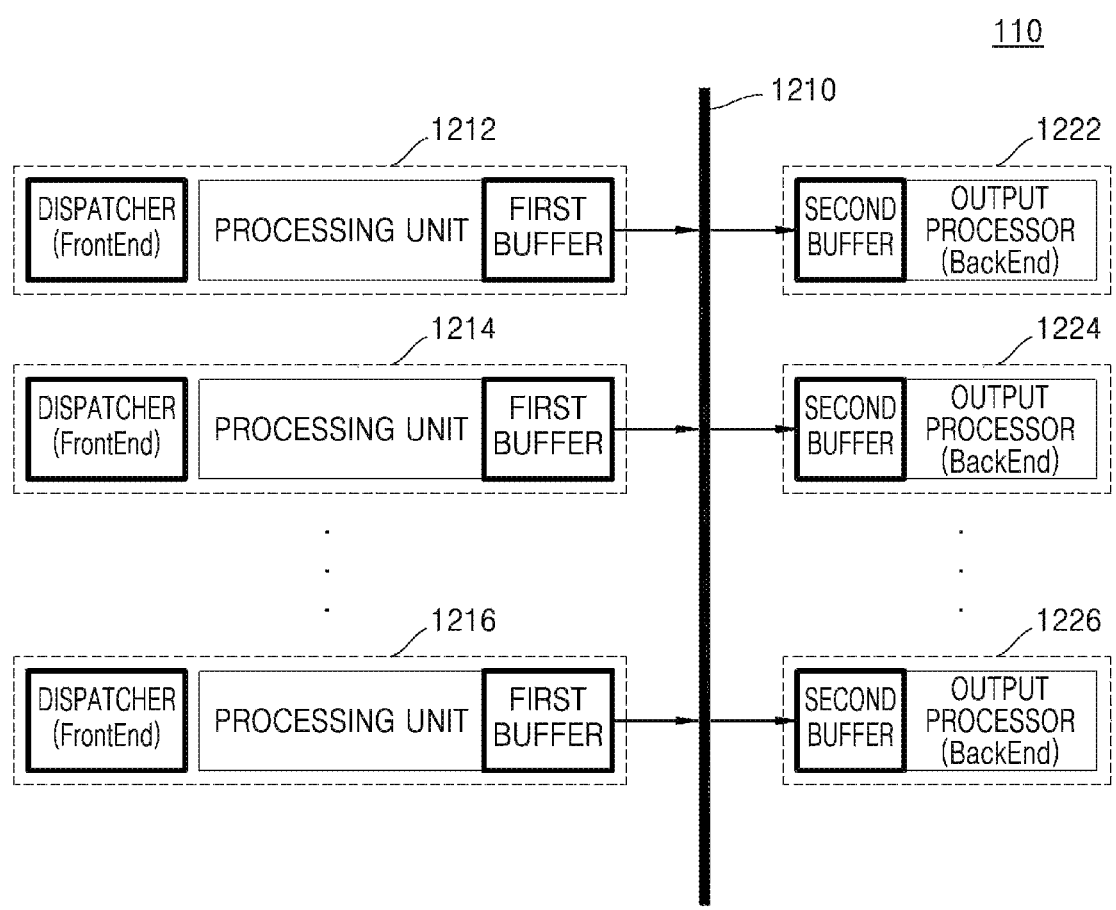
FIG. 12 illustrates an example of a hardware configuration of a processor.

FIG. 12 illustrates an example of a hardware configuration of a processor.

The processor 110 may include operation units 1212, 1214, and 1216 and output units 1222, 1224, and 1226. In addition to the description of FIG. 12 below, the operation units 1212, 1214, and 1216 and the output units 1222, 1224, and 1226 of FIG. 12 may correspond to the operation units 1112, 1114, and 1116 and the output units 1122, 1124, and 1126 of FIG. 11, such that overlapping matters are incorporated herein by reference. Thus, the above description may not be repeated here.

Referring to FIG. 12, the operation units 1212, 1214, and 1216 may be connected with the output units 1222, 1224, and 1226 through a bus 1210.

The output units 1222, 1224, and 1226 may perform an operation of selectively accumulating partial output feature maps from each of the operation units 1212, 1214, and 1216, and thus, may receive partial output feature map from the operation units 1212, 1214, and 1216 through the bus 1210.

Thus, the processor 110 may implement a transmission/reception path of the partial output feature map between the operation units 1212, 1214, and 1216 and the output units 1222, 1224, and 1226 through the bus 1210 instead of full connection therebetween, thereby reducing a hardware overhead.

Figure 13:
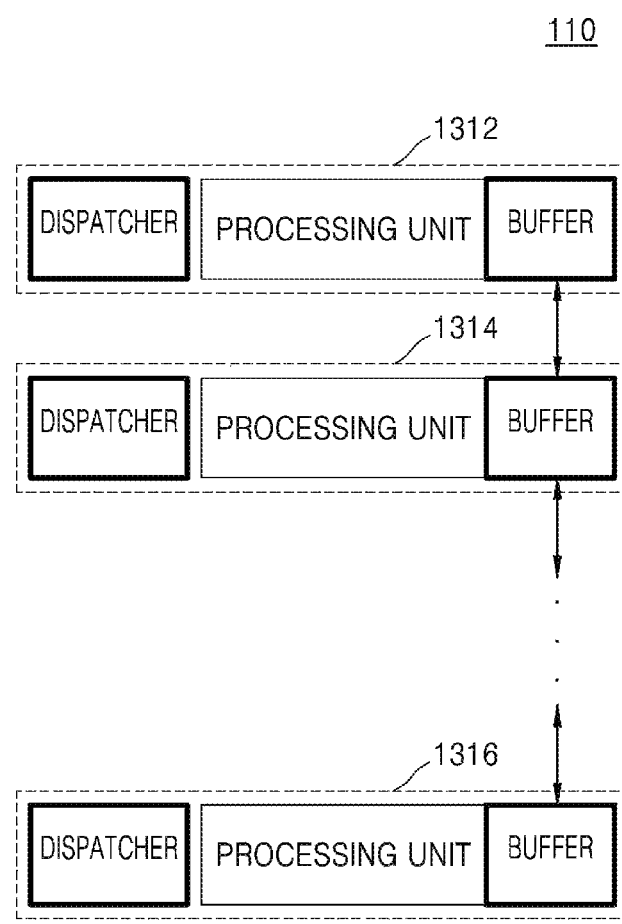
FIG. 13 illustrates an example of a hardware configuration of a processor.

FIG. 13 illustrates an example of a hardware configuration of a processor.

The processor 110 may include operation units 1312, 1314, and 1316. Each of the operation units 1312, 1314, and 1316 may generate partial output feature maps by performing an operation between different regions from among regions of the input feature map and the kernel. Each of the operation units 1312, 1314, and 1316 may include a dispatcher, a processing unit, and a buffer. For example, the dispatcher of the first operation unit 1312 may read the first region of the input feature map from the memory 120 and dispatch the read first region to the processing unit. The processing unit may generate output values by performing an operation between the first region and kernels, and the buffer may generate first partial output feature maps by accumulating the output values.

Each of the operation units 1312, 1314, and 1316 may generate each of a plurality of regions of an output feature map by accumulating a needed partial output feature map from another operation unit. In an example, buffers of adjacent operation units may be interconnected, and a buffer of each of the operation units 1312, 1314, and 1316 may receive a needed partial output feature map from a buffer of a different operation unit. For example, when a buffer of the first operation unit 1312 needs a partial output feature map output from the $N^{th}$ operation unit 1316, the first operation unit 1312 may receive the partial output feature map output from the $N^{th}$ operation unit 1316 through the buffer of the second operation unit 1314.

Figure 14:
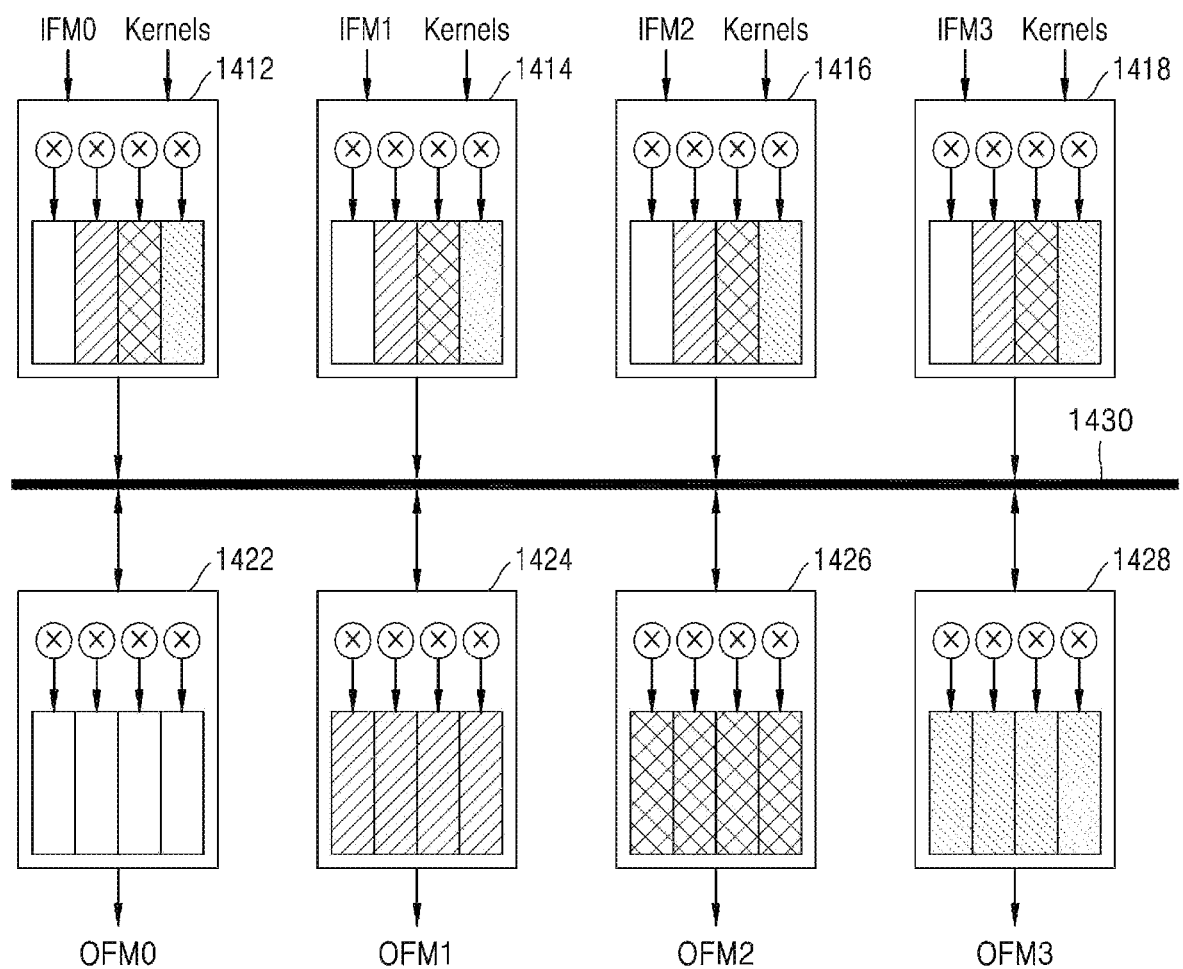
FIG. 14 illustrates an example in which operation units of a processor perform operations between a kernel and regions of an input feature map.

FIG. 14 illustrates an example in which operation units of a processor perform operations between a kernel and regions of an input feature map.

The processor 110 may include a first operation unit 1412, a second operation unit 1414, a third operation unit 1416, and a fourth operation unit 1418. The processor 110 may include a first output unit 1422, a second output unit 1424, a third output unit 1426, and a fourth output unit 1428. The processor 110 may also include a bus 1430.

The first operation unit 1412 may generate first partial output feature maps by performing an operation between a first region IFM0 of an input feature map and kernels (Kernels). In an example, the first operation unit 1412 may generate a first-first partial output feature map by performing an operation between the first region IFM0 and a first kernel, through a first processing unit, generate a first-second partial output feature map by performing an operation between the first region IFM0 and a second kernel, through a second processing unit, generate a first-third partial output feature map by performing an operation between the first region IFM0 and a third kernel, through a third processing unit, and generate a first-fourth partial output feature map by performing an operation between the first region IFM0 and a fourth kernel, through a fourth processing unit.

Similarly, the second operation unit 1414, the third operation unit 1416, and the fourth operation unit 1418 may generate second-first through second-fourth partial output feature maps, third-first through third-fourth partial output feature maps, and fourth-first through fourth-fourth partial output feature maps, by performing an operation between a second region IFM1, a third region IFM2, and a fourth region IFM3, respectively, of the input feature map and the kernels, through four processing units.

The first output unit 1422 may receive a needed partial output feature map from the operation units 1412, 1414, 1416, and 1418 through the bus 1430. For example, the first output unit 1422 may receive the first-first partial output feature map, the second-first partial output feature map, the third-first partial output feature map, and the fourth-first partial output feature map through the bus 1430, and generate a first region OFM0 of the output feature map by accumulating the first-first partial output feature map, the second-first partial output feature map, the third-first partial output feature map, and the fourth-first partial output feature map.

Likewise, the second output unit 1424, the third output unit 1426, and the fourth output unit 1428 may receive partial output feature maps through the bus 1430 and generate a second region OFM1, a third region OFM2, and a fourth region OFM3, respectively.

Figure 15:
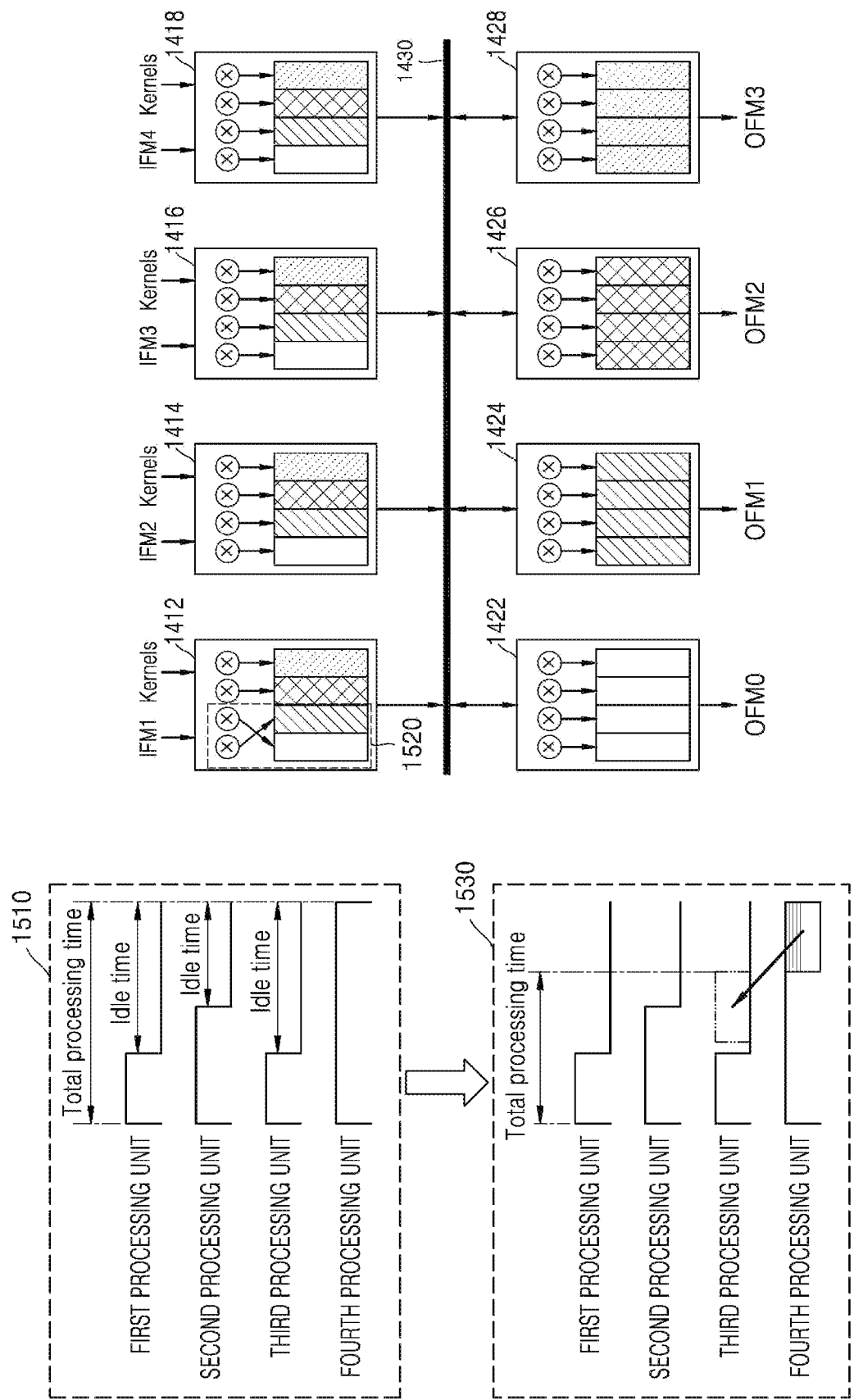
FIG. 15 illustrates an example in which operation units of a processor perform operations between a kernel and regions of an input feature map.

FIG. 15 illustrates an example in which operation units of a processor perform operations between a kernel and regions of an input feature map.

When each of the operation units 1412 through 1418 performs an operation between a region of an input feature map and kernels "Kernels," an operation time of each of processing units in the operation units 1412 through 1418 may differ. In an example, as can be seen in 1510, operation times of first through fourth processing units of the first operation unit 1412 may be different from each other. A time required for the first processing unit to perform an operation between the first region IFM0 of the input feature map and the first kernel may be shorter than a time required for the second processing unit to perform an operation between the first region IFM0 and the second kernel, and a time required for the fourth processing unit to perform an operation between the first region IFM0 and the fourth kernel may be longest. As a result, a total processing time may increase.

Thus, when performing an operation between a region of the input feature map and the kernels Kernels, in an example, each of the operation units 1412 through 1418 may control a processing unit having completed the operation earlier to perform the operation on behalf of another processing unit for load balancing. In an example, the third processing unit of the first operation unit 1412 may generate the first-third partial output feature map through the operation between the first region IFM0 and the third kernel, and then perform a part of the operation between the first region IFM0 and the fourth kernel on behalf of the fourth processing unit. As a result, as indicated by 1530, a total processing time may be reduced.

Moreover, even when a processing unit in an operation unit performs an operation on behalf of another processing unit, an output operation unit may selectively obtain a needed partial output feature map, such that an output operation unit may generate regions of an output feature map regardless of load balancing in the operation unit.

Figure 16:
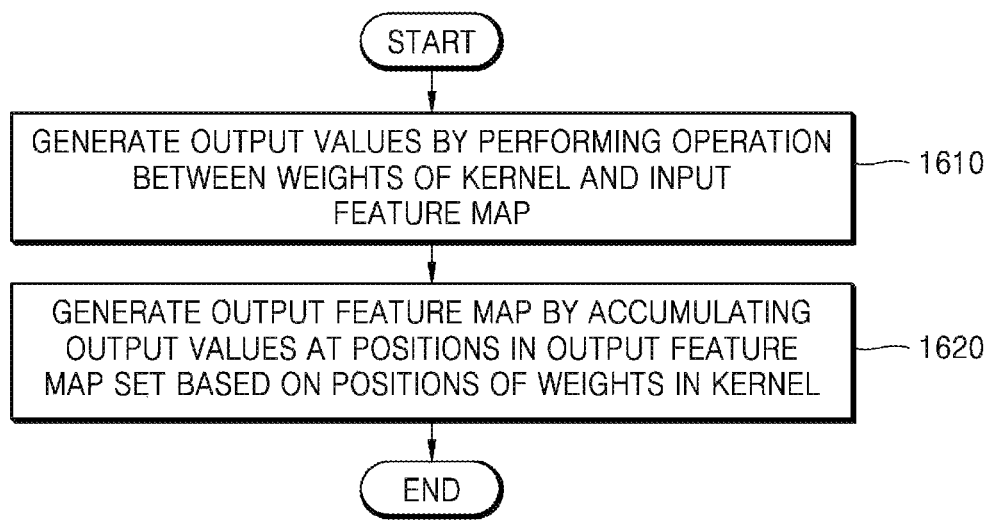
FIG. 16 is a diagram illustrating an example of an operation method of a neural network.

FIG. 16 is diagram illustrating an example of an operation method of a neural network, according to an embodiment. The operations in FIG. 16 may be performed in the sequence and manner as shown, although the order of some operations may be changed or some of the operations omitted without departing from the spirit and scope of the illustrative examples described. Many of the operations shown in FIG. 16 may be performed in parallel or concurrently. One or more blocks of FIG. 16, and combinations of the blocks, can be implemented by special purpose hardware-based computer, such as a processor, that perform the specified functions, or combinations of special purpose hardware and computer instructions.

The operation method illustrated in FIG. 16 may be performed by elements of the neural network apparatus 100 illustrated in FIGS. 3 through 15, and a repeated description will be omitted. In an example, the operation of FIG. 16 may be performed by a neural network device (100 of FIG. 3). In addition to the description of FIG. 16 below, the descriptions of FIGS. 1-15 are also applicable to FIG. 15, and are incorporated herein by reference. Thus, the above description may not be repeated here.

In operation 1610, the neural network apparatus 100 may generate output values by performing an operation between weights of a kernel and an input feature map. The neural network apparatus 100 may generate a first output value by performing an operation between the input feature map and a first weight of the kernel. The neural network apparatus 100 may generate a second output value by performing an operation between the input feature map and a second weight of the kernel.

The neural network apparatus 100 may generate first output values by performing an operation between a first region of the input feature map and each of weights of the kernel. The neural network apparatus 100 may generate second output values by performing an operation between each of the weights in the kernel and a second region that is different from the first region in the input feature map.

The neural network apparatus 100 may skip an operation between the input feature map and the first weight when the first weight of the kernel is zero.

The neural network apparatus 100 may perform an operation between each of the weights of the kernel and a compressed input feature map by continuously stream-reading the compressed input feature map.

In operation 1620, the neural network apparatus 100 may generate an output feature map by accumulating output values at positions in the output feature map set based on positions of the weights in the kernel. In an example, the neural network apparatus 100 may accumulate the first output value at the first position in the output feature map configured based on the position of the first weight in the kernel. The neural network apparatus 100 may accumulate the second output value at the second position in the output feature map configured based on the position of the second weight in the kernel.

The neural network apparatus 100 may generate a first partial output feature map by accumulating the first output values at the positions in the first partial output feature map set based on the positions of the weights in the kernel, and accumulate the first partial output feature map on the output feature map. The neural network apparatus 100 may generate a second partial output feature map by accumulating the second output values at the positions in the second partial output feature map set based on the positions of the weights in the kernel, and accumulate the second partial output feature map on the output feature map.

The neural network apparatus 100 may generate partial output feature maps by performing an operation between each of the regions of the input feature map and the kernel. The neural network apparatus 100 may generate each of the regions of the output feature map by accumulating a needed partial output feature map among the partial output feature maps. The neural network apparatus 100 may generate the partial output feature maps by performing an operation between a region from among the regions and each of a plurality of kernels.

The neural network apparatus 100, processor 110, multipliers (MUL), multiplexers (MUX), adder (Adder), accumulators & registers (Acc. Register), operation units 1112, 1114, and 1116, output units 1122, 1124, and 1126, operation units 1212, 1214, and 1216, output units 1222, 1224, and 1226, operation units 1312, 1314, and 1316, first operation unit 1412, second operation unit 1414, third operation unit 1416, fourth operation unit 1418, first output unit 1422, second output unit 1424, third output unit 1426, fourth output unit 1428, dispatcher, processing unit, dispatcher (FrontEnd), output processor (BackEnd), and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of outputting the state information. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neural network apparatus comprising:
a processor configured to:
generate output values of respective operations of the processor for each of plural weights of a kernel with respect to an input feature map, with each of the operations being between a different weight of the kernel and a same pixel of the input feature map; and
generate an output feature map by accumulating the output values, for each of one or more respective pixels of the input feature map, at positions in the output feature map that are set based on positions of the plural weights in the kernel,
wherein the processor further comprises:
respective operation portions configured to generate partial output feature maps by performing operations respectively between each region, of plural regions of the input feature map, and the kernel; and
output portions configured to generate each of multiple regions of the output feature map by accumulating at least one partial output feature map from among the partial output feature maps, wherein each of the operation portions of the processor comprise a plurality of processing units configured to generate the partial output feature maps by performing additional operations respectively between a region of the plural regions and each of a plurality of kernels,
wherein the processing units comprise:
a first processing unit configured to perform an operation between the region and a first kernel weight of multiple weights of a first kernel; and
a second processing unit configured to perform an operation between the region and a second kernel weight of multiple weights of a second kernel, and
wherein the first processing unit is further configured to perform, after completing the operation between the region and the first kernel weight of the first kernel, a part of the operation between the region and the second kernel weight of the second kernel.

2. The neural network apparatus of claim 1,
wherein, for the generating of the output values, the processor is further configured to:
generate a first output value by performing a first operation between the input feature map and a first weight of the kernel; and
generate a second output value by performing a second operation between the input feature map and a second weight of the kernel, and
wherein, for the generating of the output feature map, the processor is further configured to:
accumulate the first output value at a first position in the output feature map that is based on a position of the first weight in the kernel; and
accumulate the second output value at a second position in the output feature map that is based on a position of the second weight in the kernel,
wherein the first weight is adjacent to the second weight in the kernel.

3. The neural network apparatus of claim 1, wherein the processor is further configured to:
generate first output values by performing respective first operations between a first region of the input feature map and each of the plural weights of the kernel;
generate a first partial output feature map by accumulating the first output values at positions in the first partial output feature map that is based on positions of respective weights in the kernel; and
accumulate the first partial output feature map on the output feature map.

4. The neural network apparatus of claim 3, wherein the processor is further configured to:
generate second output values by performing respective second operations between a second region of the input feature map and each of the plural weights of the kernel, the second region being different from the first region;
generate a second partial output feature map by accumulating the second output values at positions in the second partial output feature map that is based on the positions of the respective weights in the kernel; and
accumulate the second partial output feature map on the output feature map.

5. The neural network apparatus of claim 3, wherein the first region comprises at least one of n pixels, n×m pixels, or n×m×l pixels in the input feature map, wherein n, m, and l are natural numbers greater than or equal to 1.

6. The neural network apparatus of claim 1, wherein the processor is further configured to, in response to the first weight of the plural weights of the kernel being zero, skip an operation between the input feature map and the first weight.

7. The neural network apparatus of claim 1, wherein the processor is further configured to perform an operation between each of the plural weights of the kernel and a compressed input feature map by continuously stream-reading the compressed input feature map from a memory.

8. The neural network apparatus of claim 1, wherein one or more of the respective operation portions of the processor are further configured to perform the operations respectively between the kernel and each region independently of, and in parallel with, each other.

9. The neural network apparatus of claim 1, further comprising a bus,
wherein the output units are further configured to receive the one or more partial output feature maps from the operation portions of the processor through the bus.

10. The apparatus of claim 1, further comprising a memory storing instructions that, when executed, configures the processor to generate the output values and to generate the output feature map.

* * * * *